(12) United States Patent
Iwaya et al.

(10) Patent No.: US 9,236,594 B2
(45) Date of Patent: Jan. 12, 2016

(54) LITHIUM ION SECONDARY BATTERY AND PROCESS FOR MANUFACTURING THE SAME

(75) Inventors: Shoichi Iwaya, Niigata (JP); Hitoshi Masumura, Shibata (JP); Noriyuki Sakai, Niigata (JP); Takayuki Fujita, Niigata (JP); Hiroshi Sasagawa, Shibata (JP); Hiroshi Sato, Shibata (JP)

(73) Assignee: NAMICS CORPORATION, Niigata (JP)

( * ) Notice: Subject to any disclaimer, the term of this patent is extended or adjusted under 35 U.S.C. 154(b) by 1159 days.

(21) Appl. No.: 12/527,430

(22) PCT Filed: Feb. 16, 2007

(86) PCT No.: PCT/JP2007/052888
§ 371 (c)(1),
(2), (4) Date: Sep. 11, 2009

(87) PCT Pub. No.: WO2008/099508
PCT Pub. Date: Aug. 21, 2008

(65) Prior Publication Data
US 2010/0075219 A1    Mar. 25, 2010

(51) Int. Cl.
| | |
|---|---|
| *H01M 10/04* | (2006.01) |
| *H01M 10/38* | (2006.01) |
| *H01M 4/70* | (2006.01) |
| *H01M 4/58* | (2010.01) |
| *H01M 4/50* | (2010.01) |
| *H01M 4/00* | (2006.01) |
| *H01M 2/14* | (2006.01) |

(52) U.S. Cl.
CPC ..................................... *H01M 2/14* (2013.01)

(58) Field of Classification Search
None
See application file for complete search history.

(56) References Cited

U.S. PATENT DOCUMENTS

| | | | |
|---|---|---|---|
| 2004/0185336 A1 | 9/2004 | Ito et al. | |
| 2005/0250010 A1* | 11/2005 | Kurihara et al. | 429/217 |
| 2006/0073388 A1* | 4/2006 | Harada et al. | 429/245 |
| 2008/0102363 A1* | 5/2008 | Uemura et al. | 429/162 |

FOREIGN PATENT DOCUMENTS

| | | |
|---|---|---|
| CN | 1720627 | 1/2006 |
| JP | 06-231796 | 8/1994 |
| JP | 09-283143 | 10/1997 |
| JP | 2001-015152 | 1/2001 |
| JP | 2004-273436 | 9/2004 |
| WO | WO2007/034709 | * 3/2007 |

OTHER PUBLICATIONS

International Search Report—PCT/JP2007/052888—May 15, 2007.

* cited by examiner

*Primary Examiner* — Alix Echelmeyer
(74) *Attorney, Agent, or Firm* — Young & Thompson

(57) ABSTRACT

In multilayer wholly solid lithium ion secondary batteries, a laminate having a collector layer of material with high conductivity superimposed on an active material layer has been disposed so as to attain a lowering of battery impedance. Consequently, in the fabrication of each of positive electrode layer and negative electrode layer, stacking of three layers consisting of an active material layer, a collector layer and an active material layer has been needed, thereby posing the problem of complex processing and high production cost. In the invention, a positive electrode layer and a negative electrode layer are fabricated from paste consisting of active material mixed with conductive substance in a given mixing ratio, and no collector layer is disposed. This realizes process simplification and manufacturing cost reduction without deterioration of battery performance and has also been effective in enhancing of battery performance, such as improvement to cycle characteristics.

16 Claims, 16 Drawing Sheets

(a)

(b)

(c)

(d)

(e)

SEM photographs of green-sheet cross-section (a) The cross-section of a positive electrode
    The volume mixing ratio of active material = 31.8Vol%

(b) The cross-section of a negative electrode
    The volume mixing ratio of active material = 41.6Vol%

A SEM photograph of sintered material cross-section

Active material is shown as black part and
conductive material is shown as white part.

(a) The mixture of positive electrode active material
($LiMn_2O_4$) and conductive material ($Ag^{85}Pd^{15}$)

Volume mixing ratio of active material = 15.1Vol%

Volume mixing ratio of active material = 31.8Vol%

Volume mixing ratio of active material = 50.6Vol%

Volume mixing ratio of active material = 72.3Vol%

(b) The mixture of negative electrode active material
    ($Li_{4/3}Ti_{5/3}O_4$) and conductive material ($Ag^{85}Pd^{15}$)

Volume mixing ratio of active material = 21.1Vol%

Volume mixing ratio of active material = 41.6Vol%

Volume mixing ratio of active material = 61.6Vol%

Volume mixing ratio of active material = 81.1Vol%

Battery cell cross-section after sintering (a) SEM image (b) EDS image

The dependency of conductivity on the volume mixing ratio of active material to conductive material Positive electrode active material : $LiCoO_2$
—○— Positive electrode ($LiCoO_2$ + Ag)
Negative electrode active material : $Nb_2O_5$
--●-- Negative electrode ($Nb_2O_5$ + Ag)
Conductive material : Ag

LITHIUM ION SECONDARY BATTERY AND PROCESS FOR MANUFACTURING THE SAME

TECHNICAL FIELD

The present invention relates to a multilayer all solid state lithium ion secondary battery including a laminate having a positive electrode layer, a solid electrolyte layer, and a negative electrode layer.

BACKGROUND ART (Patent Reference 1)
JP-A-2006-261008
(Patent Reference 2)
JP-A-2000-285910
(Patent Reference 3)
JP-A-2007-5279

In recent years, electronics has been remarkably developed, which has enabled the production of small lightweight thin portable electronic devices with multiple functions. Accordingly, a demand for small lightweight thin reliable batteries as power source for such portable electronic devices has been rapidly increased. In response to the demand, a multilayer lithium ion secondary battery with a laminate where positive electrode layers and negative electrode layers are stacked via solid electrolyte layers. A multilayer lithium ion secondary battery is fabricated by stacking battery cells having a thickness of tens of μm, so that it can be easily realized to produce small lightweight thin batteries. Especially, parallel type or serial-parallel type multilayer batteries are superior in that they have high discharge capacity even when the battery cell area is small. And all solid state lithium ion secondary batteries using solid electrolyte material in place of electrolyte liquid are reliable without problems such as liquid leakage or liquid evaporation. Furthermore, high unit cell voltage and high energy density can be obtained because they are batteries using lithium.

As for a multilayer all solid state lithium ion secondary battery, a battery is suggested according to Patent Reference 1, where a negative electrode layer, a collector, a negative electrode layer, a electrolyte layer, a positive electrode layer, a collector, and a positive electrode layer are stacked one on top of the other in sequence. FIG. 16 is cross-sectional diagrams of a conventional lithium ion secondary battery. In a battery 101, a collector layer 105 disposed between positive electrode layers 103 and a collector layer 106 disposed between negative layers 104 are stacked interposed by an electrolyte layer 102. The battery shown in FIG. 16 is a parallel type battery where a positive electrode terminal 107 and a negative electrode terminal 108, which are the output terminals of the battery, are disposed along the sides of the laminate and contact with positive electrode layers 103 and negative electrode layers 104, respectively. The battery described in Patent Reference 1 consists of a positive electrode layer and a negative electrode layer made of only active material. Active material such as metal oxide or metal sulfide is described as preferred material for a positive electrode, and active material such as metal lithium or lithium alloy is described, as preferred material for a negative electrode.

As shown in FIG. 16, the distance from an electrode terminal to the edge of an electrode layer (positive electrode and negative electrode) is comparatively long in parallel multilayer batteries. And, among active material used for a lithium ion battery, oxide material has advantage that lithium ion migration causes small volume change of the electrode layer and hardly causes pulverization and abrasion, but at the same time it has disadvantage that its electrical conductivity is low. When electrical resistance in an electrode layer is high, the internal impedance of the battery is high, then discharge characteristic on load degrades, and discharge capacity decreases. Corresponding to these problems, a battery structure is adopted to reduce electrode impedance by stacking a collector layer with high conductivity on an electrode layer with low conductivity in Patent Reference 1.

However, to fabricate a battery with such a structure, coating and drying process is necessary for the formation of an electrode layer, a collector layer, and an electrode layer for each of a positive electrode layer and a negative electrode layer. Furthermore, alignment process is necessary to align an electrode layer and a collector layer. So, especially in the case that many layers are stacked, the manufacturing process is complicated and eventually the production cost is high. Since many coating and drying processes are repeated, resulting battery manufacturing yield will become quite low due to the intensity drop and damage (sheet-attack) of an electrolyte layer which is disposed under an electrode layer or a collector layer caused by solvent used in the formation process of the electrode layer and the electrolyte layer.

Patent Reference 2 describes attempted procedure to reduce the electrical resistivity of an electrode layer itself in a multilayer lithium ion battery. Patent Reference 2 describes a lithium battery having an electrode layer composed of sintered material including solid electrolyte material and metal oxide where electrically conductive particles are diversified. To form an electrode layer, metal oxide which is active material, solid electrolyte material, and electrically conductive particles are mixed with a weight ratio of 8:1:1. Solid electrolyte material is mixed so as to widen the contact area between active material and solid electrolyte material and lower the impedance in the electrode.

However, this technology has a problem that battery energy density is low because solid electrolyte material is included in the electrode layer and sufficient active material cannot be mixed in the electrode layer. Also sufficient amount of conductive particles cannot be mixed in the electrode layer by the same reason. Furthermore, since conductive particles are diversified in electrolyte material in the electrode, they contact with each other by point-contact or they do not contact at all, so that impedance reduction of the battery electrode cannot be effectively accomplished. This is also supported by the embodiment of Patent Reference 2 describing a battery having a collector layer to reduce impedance in addition to an electrode layer. This description shows that, by using the technology disclosed by Patent Reference 2, some minor reduction of impedance can be obtained by mixing conductive particles in the electrode, but satisfactory reduction of impedance cannot be obtained in order to fabricate high-performance batteries without using collector layers.

Accordingly, the present invention is intended to solve above problems and provide lithium ion secondary battery and manufacturing method thereof which enables to reduce electrode impedance, to simplify manufacturing process, and to reduce production cost without using collector layers in a multilayer all solid state lithium ion secondary battery including a laminate having a positive electrode layer, a solid electrolyte layer, and a negative electrode layer.

DISCLOSURE OF THE INVENTION

The present invention refers to a lithium ion secondary battery, which is a multilayer all solid state battery including a laminate in which a positive electrode layer and a negative electrode layer are stacked alternately interposed by a solid electrolyte layer, said positive electrode layer and/or said negative electrode layer having a structure where active material is supported by conductive matrix composed of conductive material, wherein the area ratio of said active material to said conductive material ranges from 20:80 to 65:35 at the cross-sectional surface of said positive electrode layer and/or said negative electrode layer.

Accordingly, the following effects will be obtained:

1. By mixing active material and conductive material with a certain mixture ratio in order that the area ratio of the active material to the conductive material ranges from 20:80 to 65:35 at the cross-sectional surface of an electrode layer, the structure of a battery becomes the one where active matrix material is supported by conductive matrix which supplement low conductive active material with its high electrical conductivity, accordingly battery performance is improved. For example, impedance reduction and discharge capacity increase will be achieved.

2. An electrode layer having a single sub-layer works as both of an active material layer and a collector layer both of which are used in the conventional battery. Since a collector is not essentially needed in a battery according to the invention, process simplification, process reduction, and sheet attack prevention will be achieved.

3. Active material is entwined with conductive material by the structure of an electrode where active material is supported by conductive matrix, so that the expansion and contraction of a battery due to charge-discharge cycle will be suppressed which consequently prevents abrasion of active material from conductive material, and charge-discharge characteristics will be effectively improved.

4. It will be possible to adopt active material, which used to be the material difficult to adopt due to its poor conductivity, as utilizable active material for the electrode of a lithium ion secondary battery.

A lithium ion secondary battery of the present invention is preferably characterized by having a plurality of battery unit cells, each unit cell composed of a laminate, connected in parallel, in series, or in series-parallel combination, the laminate which is formed using the method including the steps of: stacking a positive electrode layer, a solid electrolyte layer, and a negative electrode layer to form the laminate, and co-firing the laminate.

Accordingly, in particular, in a multilayer battery where terminals are disposed in the side surfaces of the battery and battery cells are connected in parallel, in series, or in series-parallel combination, battery performance will be especially improved. For example, impedance reduction due to electrode conductivity improvement and discharge capacity increase will be achieved. Also, the junction state at the interface will be improved so that battery impedance will be effectively reduced.

Also a lithium ion secondary battery of the present invention is characterized by having electrode layers wherein active material is preferably compound consisting of transition metal oxide or transition metal composite oxide, and more preferably one compound or more than two compounds selected from the group consisting of lithium manganese composite oxide, lithium nickel composite oxide, lithium cobalt composite oxide, lithium vanadium composite oxide, lithium titanium composite oxide, manganese dioxide, titanium oxide, niobium oxide, vanadium oxide, tungsten oxide.

Accordingly, the volume change of an electrode due to lithium ion movement will be smaller, electrode pulverization and abrasion will be prevented, and the reliability of a battery will be improved.

Also a lithium ion secondary battery of the present invention is characterized by having electrode layers wherein conductive material is preferably metal selected from the group consisting of silver, palladium, gold, platinum, aluminum, or alloy composed of more than two metals selected from the group consisting of silver, palladium, gold, platinum, copper, aluminum.

Also a lithium ion secondary battery of the present invention is characterized by having electrode layers wherein active material for positive electrode layer is preferably lithium manganese composite oxide, active material for negative electrode layer is preferably lithium titanium composite oxide, conductive material is silver palladium.

Also, preferably, conductivity of above positive electrode layer and above negative electrode layer is not less than $1 \times 10^1$ S/cm.

Accordingly, battery performance will be improved. For example, impedance reduction and discharge capacity increase will be achieved The present invention refers to a manufacturing method of a lithium ion secondary battery comprising the steps of:

dispersing solid electrolyte material in binder and solvent to form paste for solid electrolyte layer, coating and drying said paste for solid electrolyte layer to form green-sheet for solid electrolyte layer, mixing active material and conductive material to form mixture and dispersing said mixture in binder and solvent to form paste for positive electrode layer and/or negative electrode layer, coating and drying said paste for positive electrode layer and/or said paste for negative electrode layer to form green-sheet for positive electrode layer and/or green-sheet for negative electrode layer, stacking said green-sheet for positive electrode layer and said green-sheet for negative electrode layer alternately interposed by said green-sheet for solid electrolyte layer to form a laminate, and co-firing said laminate to form a sintered laminate, wherein volume mixing ratio of said active material and said conductive material ranges from 20:80 to 65:35.

Accordingly, the following effects will be obtained:

1. By mixing active material and conductive material with a certain mixture ratio in order that the area ratio of the active material to the conductive material ranges from 20:80 to 65:35 at the cross-sectional surface of an electrode layer, the structure of a battery becomes the one where active matrix material is supported by conductive matrix which supplement low conductive active material with its high electrical conductivity, accordingly battery performance is improved. For example, impedance reduction and discharge capacity increase will be achieved.

2. An electrode layer having a single sub-layer works as both of an active material layer and a collector layer both of which are used in the conventional battery. Since a collector is not essentially needed in a battery according to the invention, process simplification, process reduction, and sheet attack prevention will be achieved.

3. Active material is entwined with conductive material by the structure of an electrode where active material is supported by conductive matrix, so that the expansion and contraction of a battery due to charge-discharge cycle will be suppressed which consequently prevents abrasion of active material from conductive material, and charge-discharge characteristics will be effectively improved.

4. It will be possible to adopt active material, which used to be the material difficult to adopt due to its poor conductivity, as utilizable active material for the electrode of a lithium ion secondary battery.

A manufacturing method of a lithium ion secondary battery of the present invention is characterized by that above active material to form above paste for positive electrode layer is positive electrode active material powder, above active material to form above paste for negative electrode layer is negative electrode active material powder, above conductive material is conductive material powder, grain size of above positive electrode active material powder, above negative electrode material powder, and conductive material powder is not greater than 3 µm, grain size ratio of above positive electrode active material powder to above conductive material powder ranges from 1:50 to 50:1, and grain size ratio of above negative electrode active material powder to above conductive material powder ranges from 1:50 to 50:1.

Accordingly, conductive matrix with high continuity and high conductivity in an electrode will be formed.

Also a manufacturing method of a lithium ion secondary battery of the present invention is characterized by that above active material is one compound or more than two compounds selected from the group consisting of lithium manganese composite oxide, lithium nickel composite oxide, lithium cobalt composite oxide, lithium vanadium composite oxide, lithium titanium composite oxide, manganese dioxide, titanium oxide, niobium oxide, vanadium oxide, tungsten oxide, and above conductive material is metal selected from the group consisting of silver, palladium, gold, platinum, aluminum, or alloy composed of more than two metals selected from the group consisting of silver, palladium, gold, platinum, copper, aluminum.

And also, in particular, a lithium ion secondary battery of the present invention is characterized by having electrode layers wherein active material for positive electrode layer is preferably $LiMn_2O_4$, active material for negative electrode layer is preferably $Li_{4/3}Ti_{5/3}O_4$, conductive material is silver-palladium alloy and/or the mixture of silver and palladium.

Also, preferably, sintering temperature to form above sintered laminate is not lower than 600° C., and not, higher than 1100° C.

Accordingly, since sintering is conducted at preferable temperature, conductive matrix with high continuity and high conductivity will be formed in the electrode.

Figure 1:
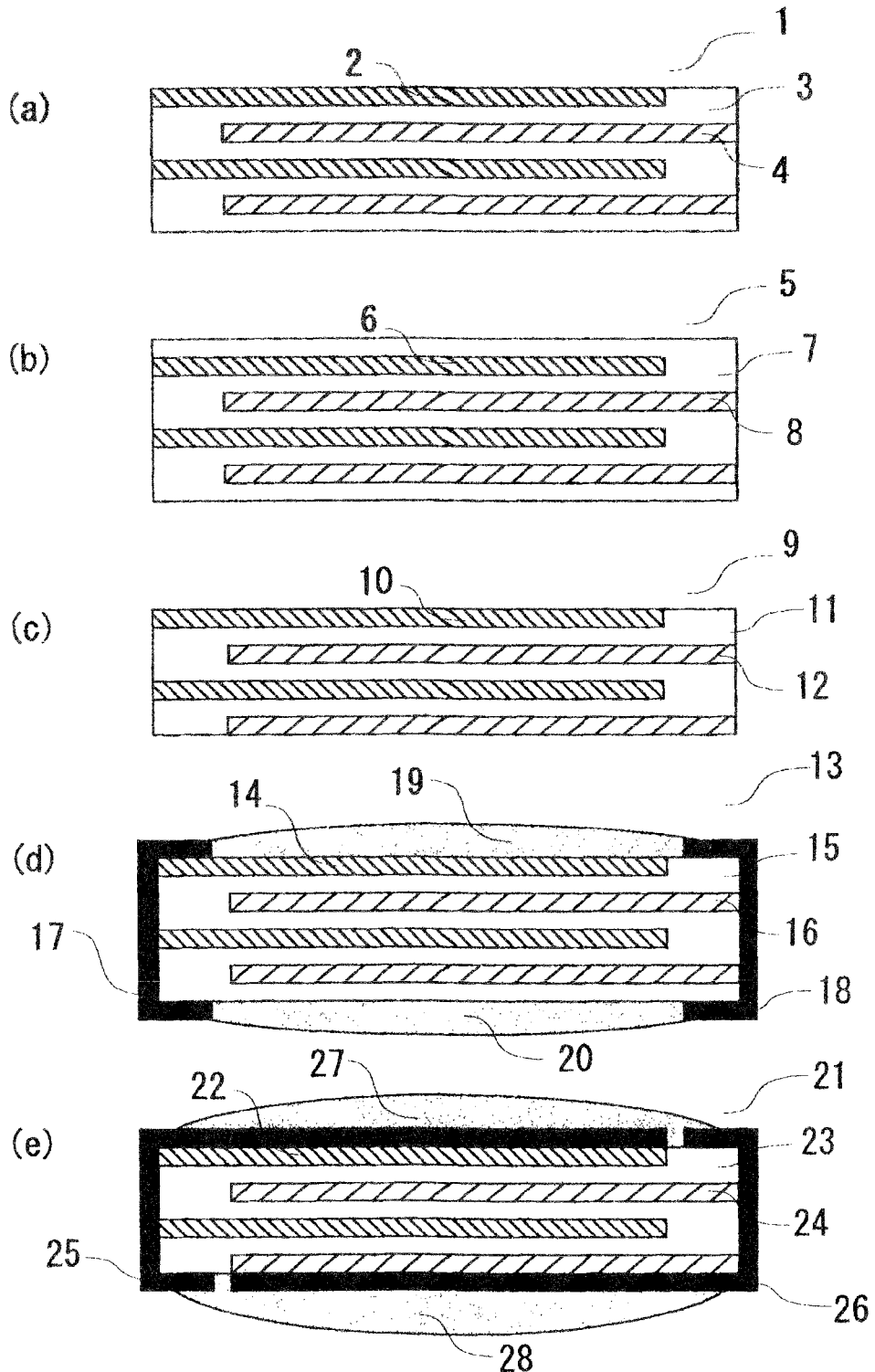
FIG. 1 (*a*)-(*e*) are cross-sectional diagrams of lithium ion secondary battery of the present invention.

DESCRIPTION OF REFERENCE NUMERALS AND SIGNS 1, 5, 9 laminate
13, 21, 101 battery
2, 6, 10, 14, 22, 43, 47, 103 positive electrode layer
4, 8, 12, 16, 24, 44, 46, 104 negative electrode layer
3, 7, 11, 15, 33, 102, 42, 45 solid electrolyte layer
17, 25, 48, 107 positive electrode terminal
18, 26, 49, 108 negative electrode terminal
19, 20, 27, 28 protection layer
31, 33, 36 PET substrate
32, 34, 37, 39 solid electrolyte sheet
35, 41 positive electrode sheet
38, 40 negative electrode sheet
51 solvent
52, 54, 56 active material
53, 55, 57 conductive material
105, 106 collector layer

BEST MODE FOR CARRYING OUT THE INVENTION

Best mode for carrying out the present invention will be described in detail below.

As stated above, Patent Reference 2 insists that sufficient contact area between active material and solid electrolyte material cannot be ensured so as to fabricate high-performance batteries unless solid electrolyte material is not mixed in the materials to form electrode layers. And the manufacturing process of the battery described in the prior art includes the process steps comprising pressure forming each of a positive electrode layer and a negative electrode layer, sintering each of them, and stacking the positive electrode layer, an electrolyte layer, and the negative electrode layer.

On the other hand, lithium ion secondary battery according to the present invention is fabricated using a manufacturing method comprising the steps of: coating and drying paste formed by dispersing material powder to form a green-sheet (a sheet), stacking a green-sheet for positive electrode layer and a green-sheet for negative electrode layer alternately interposed by a green-sheet for solid, electrolyte layer to form a laminate, and co-firing the laminate to form a sintered laminate. Inventors of the present invention has discovered that, by fabricating batteries according to the manufacturing method, molecule strings which constitute the electrode layer entwined and contact closely with molecules of the solid electrolyte layer without hollow at the interface of each layers, so that sufficient wide contact area is ensured between active material and solid electrolyte material, thereby enabling to fabricate high-performance batteries without having to mixing solid electrolyte material in the electrode layer.

In this specification, the term "electrode" refers to both of a positive electrode and a negative electrode in a battery. Mixture of active material and conductive material is used for electrode material in a lithium ion secondary battery in the present invention. Since electrolyte material is not mixed in the electrode material, it is possible to increase the amount of active material content in the electrode, to increase battery energy density, and to reduce electrode impedance.

Furthermore, inventors of the present invention have evaluated a battery fabricated using several different conditions of mixture ratio of positive electrode active material to conductive material as material for preparing paste, and have discovered that a high-performance battery with the highest conductivity, the highest discharge capacity can be fabricated when the volume mixing ratio of active material to conductive material ranges from 20:80 to 65:35. They have studied the cross-section of battery fabricated by this condition using SEM and EDS, then have discovered that the area ratio of the active material to the conductive material ranges from 20:80 to 65:35 at the cross-sectional surface of the electrode layer, which is the same as the volume ratio of active material to conductive material. And when the mixture volume ratio of conductive material is not less than 35%, it is found that conductive material is distributed continuously in the cross-section of electrode and active material is supported in the matrix-like conductive material. To form such a matrix structure, it is found that a laminate has to be sintered at high temperature of above 600° C. In the technology described in Patent Reference 2, it is estimated that matrix-like conductive material mentioned above was not formed since the amount of conductive material in an electrode used was not sufficient and the sintering temperature of 550° C. used was too low.

In this specification, the term "conductive matrix" or "matrix-like conductive material" refers to a structure wherein conductive material particles are 3-dimensionally continuously connected with each other. The term "metal matrix" refers to conductive matrix where the conductive material is metal. And also, the term "a structure wherein active material is supported by conductive material" refers to a structure wherein active material particles are distributed in conductive material particles which are 3-dimensionally continuously connected with each other. It makes no difference if the active material particles are distributed continuously or discontinuously, but it is preferable that they are distributed uniformly in the electrode. In addition, the term "particles are 3-dimensionally continuously connected" is used if only the particles are connected 2-dimensionally continuously connected in at least one plane, even when a part of them may not be connected in other plane.

Even when small amount of additive is mixed as electrode material in addition to active material and conductive material, it is possible to make an electrode structure to be conductive matrix wherein active material is supported, and to fabricate high performance batteries with high discharge capacity by mixing active material and conductive material as paste material with a mixture ratio in the range of 20:80 to 65:35, if the amount of additive is not so much as the amount of active material and/or conductive material is reduced notably.

Both of positive electrode layer and negative electrode layer or any one of them can be formed using the material which is mixed by active material and conductive material with preferable mixture ratio to fabricate a high performance battery. It is effective for the process simplification and the process cost reduction only if the technology is applied for any one of positive electrode layer and negative electrode layer.

[Structure of Battery]

FIG. 1 (a)-(e) are cross-sectional diagrams of lithium ion secondary battery of the present invention, that illustrates the structure of a laminate and a battery, including the variations thereof.

Figure 3:
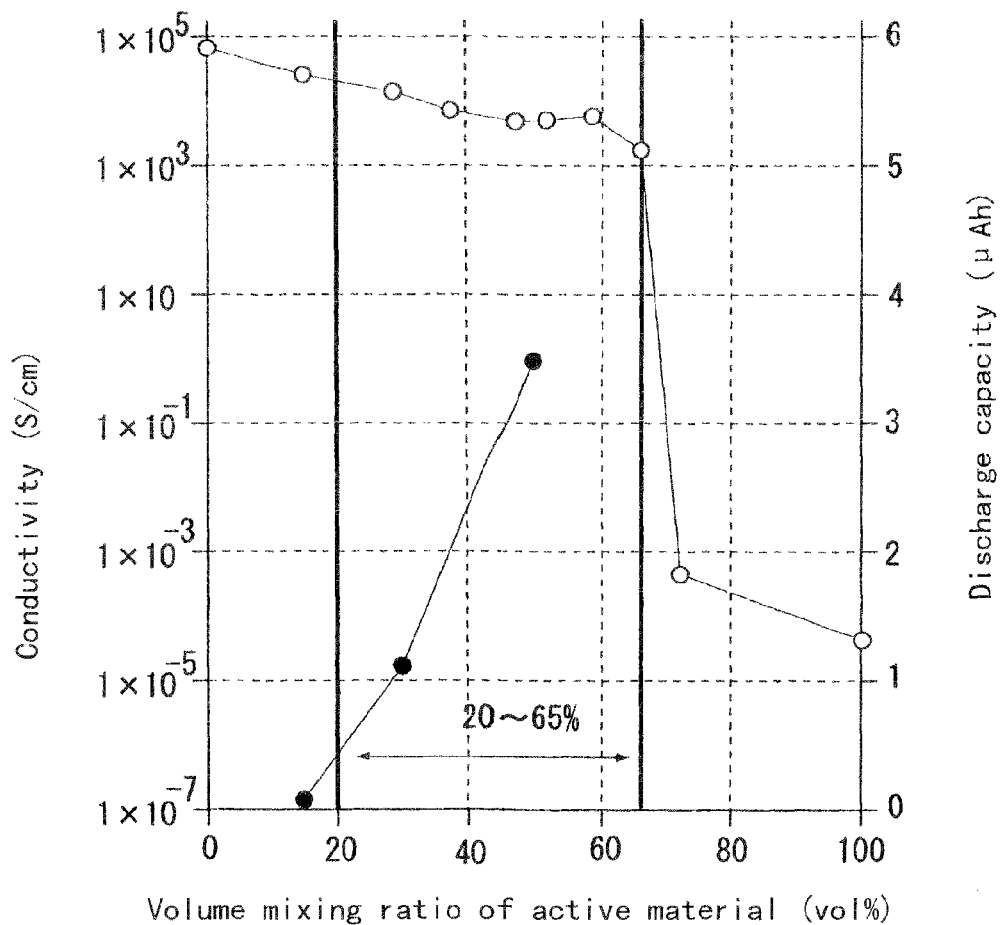
FIG. 3 is a graph illustrating the dependency of conductivity and discharge capacity on the volume mixture ratio of positive electrode active material.

FIG. 1(a) is cross-sectional diagram of the most basic structure of a laminate. A laminate 1 is formed by a positive electrode layer 2 and a negative electrode layer 4 which are stacked alternately interposed by a solid electrolyte layer 3. In case that a laminate is formed after a positive electrode layer or a negative electrode layer are formed on a solid electrolyte layer, which is the case as battery manufacturing method mentioned below, a structure having a solid electrolyte layer at bottom surface and an electrode layer at top surface is a structure fabricated with minimum fabrication steps. In FIG. 1(a), 3 battery cells are illustrated if a laminate where one positive electrode layer and one negative electrode layer are stacked is counted as one battery cell. A lithium ion secondary battery according to the present invention can be applied not only for the battery where 3 battery cells are stacked as shown in FIG. 1(a), but also for batteries where any number of battery cells are stacked. It is possible to adjust the number of battery cells to form a battery in a wide range according to the required discharge capacity and current specification of a lithium ion secondary battery. The number of battery cells ranges preferably from 2 to 500, and more preferably from 5 to 250 to make full use of the merit of the present invention. In FIG. 1(a), for example, a positive electrode layer sticks out at the left side of the laminate and a negative electrode layer sticks out at the right side of the laminate, which is a preferable structure for parallel-type batteries or series-parallel combination type batteries where electrode terminals are disposed at the side surface of a battery. The technology according to the present invention can be applied not only to a parallel-type battery as shown in FIG. 1 but also to a series type batteries or a series-parallel type battery.

FIG. 1(b) shows a structure wherein a solid, electrolyte layer 7 is disposed at the top surface and at the bottom surface of a laminate 5.

FIG. 1(c) shows a structure wherein a positive electrode layer is disposed at the top surface of a laminate 9 and a negative electrode layer is disposed at the bottom surface thereof. In the laminate with a structure shown in FIG. 1(c), electrode layers can be disposed in contact with conductive electrode terminals all along the top and bottom surfaces, which is accordingly effective to lower the impedance of battery cells.

FIG. 1(d) shows a cross-section of lithium ion secondary battery 13 wherein electrode terminals are disposed on the side surface of a laminate as shown in FIG. 1(a), and protection layer is disposed. A positive electrode terminal 17 and a positive electrode layer 14 are electrically connected at the left side surface of a battery 13, and a negative electrode terminal 18 and a negative electrode layer 16 are electrically connected at the right side surface thereof. The function of a protection layer disposed at the outer surface of a battery is to protect a battery electrically, physically, and chemically. Material for a protection layer is preferably material which is environment-conscious having properties of excellent electrical isolation, durability, humidity resistance. In particular, it is preferably ceramics or resin.

[Material to Produce Battery]

(Active Material)

Active material to form an electrode layer of a lithium ion secondary battery according to the present invention is preferably material which effectively emits and absorbs lithium ions. For example, it is preferably transition metal oxide and transition metal composite oxide. In particular, it is preferably lithium manganese composite oxide, lithium nickel composite oxide, lithium cobalt composite oxide, lithium vanadium composite oxide, lithium titanium composite oxide, manganese dioxide, titanium oxide, niobium oxide, vanadium oxide, tungsten oxide. Specifically, lithium manganese composite oxide and lithium titanium composite oxide have property of small volume change and they are hard to cause pulverization and abrasion of electrode, so they can be preferably used as active material.

There is no clear difference between positive electrode active material and negative electrode active material. Electric potentials of two chemical compounds are compared and one chemical compound with higher electric potential can be used as positive electrode active material and the other chemical compound with lower electric potential can be used as negative electrode active material.

(Conductive Material)

Conductive material to form an electrode layer of a lithium ion secondary battery according to the present invention is preferably material with high conductivity. For example, it is preferably oxidation-resistant metal or alloy. Here, oxidation-resistant metal or alloy refers to those with conductivity of higher than $1 \times 10^1$ S/cm after sintering in the atmospheric ambient. In particular, it is preferably metal selected from the group consisting of silver, palladium, gold, platinum, aluminum, or alloy composed of more than two metals selected from the group consisting of silver, palladium, gold, platinum, copper, aluminum. In particular, it is preferably AgPd. To be more precise, it is preferably mixture powder of Ag powder and Pd powder or powder of AgPd alloy.

Same compound or different compound can be used as conductive material for being mixed with active material to form each of a positive electrode layer and a negative electrode layer. It is preferable to select and use conductive material, mixture ratio, and process condition suitable for each of positive electrode and negative electrode.

(Electrolyte Material)

Electrolyte material to form a solid electrolyte layer of a lithium ion secondary battery according to the present invention is preferably material with low electron conductivity and high lithium ion conductivity. And it is preferably inorganic material which can be sintered at high temperature in atmospheric ambient. For example, it is preferably at least one compound selected from the group consisting of lithium silicate phosphoric acid ($Li_{3.5}Si_{0.5}P_{0.5}O_4$), lithium titanium phosphoric acid ($LiTi_2(PO_4)_2$), lithium germanium phosphoric acid ($LiGe_2(PO_4)_3$), $Li_2O$—$Si_2$, $Li_2O$—$V_2O_5$—$SiO_2$, $Li_2O$—$P_2O_5$—$B_2O_3$, $Li_2O$—$GeO_2$. Furthermore, it can be material of compound doped with heterogeneous element or $Li_3PO_4$, $LiPO_3$, $Li_4SiO_4$, $Li_2SiO_3$, $LiBO_2$, etc. And material to form solid electrolyte layer can be crystalline, amorphous, or glassy.

[Manufacturing Method of Battery]

A sintered laminate to form a lithium ion secondary battery according to the present invention is fabricated using a manufacturing method comprising the steps of: processing each material for a positive electrode layer, a solid electrolyte layer, a negative electrode layer, and any protection layer to form paste, coating and drying the paste to form a green-sheet, stacking the green-sheet to form a laminate, and sintering the laminate.

Calcined inorganic salt, for example, can be used to prepare positive electrode active material, negative electrode active material, and solid electrolyte material for processing to paste. The calcine temperature is preferably not lower than 700° C. for all of positive electrode active material, negative electrode active material, solid electrolyte material. By processing at this calcine temperature, chemical reaction of raw material proceeds sufficiently and the function of each material is ensured after co-firing.

A method to process to paste is not limited to any specific means, but, for example, paste can be obtained by mixing the powder of each above material in vehicle composed of organic solvent and binder. For example, it can be obtained by mixing $LiMn_2O_4$ powder as positive electrode active material and Ag and Pd metal powder as conductive material with predetermined volume mixture ratio to form a mixture, dispersing the mixture in solvent and vehicle to form paste for a positive electrode. Powder diameter (grain size) of positive/negative electrode active material and conductive material are preferably not greater than 3 µm. Powder diameter ratio of positive/negative electrode active material to conductive material is preferably from 1:50 to 50:1. When a battery is fabricated using the above condition of powder diameter and powder diameter ratio, conductive matrix is suitably formed in the electrode by sintering, and active material is suitably supported by the matrix, so as to effectively improve battery performance and obtain effects such as impedance reduction and discharge capacity increase. The volume mixture ratio of active material powder to conductive material powder preferably ranges from 20:80 to 65:35 AgPd used as conductive material is preferably the metal powder mixture of Ag and Pd, synthesized powder of AgPd fabricated by coprecipitation process, or the powder of AgPd alloy. Using the above methods, each of the paste for positive electrode layer, solid electrolyte layer, and negative electrode layer is prepared.

A green-sheet can be fabricated by coating the prepared paste on a substrate such as a PET sheet according to a desired order, optionally drying the coated material, and then detaching it from the substrate. Paste coating method is not limited to any specific one, but any known technology can be used such as screen printing, coating, transfer printing, doctor blade method.

Next, a laminate is fabricated by stacking each of prepared green-sheet of a positive electrode layer, a solid electrolyte layer, and a negative electrode layer according to a desired order, a desired number of stacked laminate, optionally conducting alignment or ablation. It is preferable to align and stack a positive electrode layer and a negative electrode layer so that the edge of the positive electrode layer and the negative electrode layer does not line up, when a parallel type or series-parallel combination type battery is produced.

Next, compression bonding is conducted on the fabricated laminate together. The laminate is heated during compression bonding at the temperature of 40° C. to 80° C. After compression bonding, the laminate is sintered, for example, in the atmospheric ambient. The term "sintering" or "co-firing" refers to a heating treatment for "sinter" The term "sinter" refers to a phenomenon that solid powder aggregate gets hard to form dense object which is called "sintered body" when heated at the temperature under melting point. Sintering temperature preferably ranges from 600 to 1100° C. for the fabrication of a lithium ion secondary battery of the present invention. Conductive matrix is not formed in an electrode layer if the temperature is under 600° C., and a solid electrolyte layer will melt or the structure of positive/negative electrode active material will degrade if the temperature is over 1100° C. Sintering time preferably ranges from 1 to 3 hours.

Figure 2:
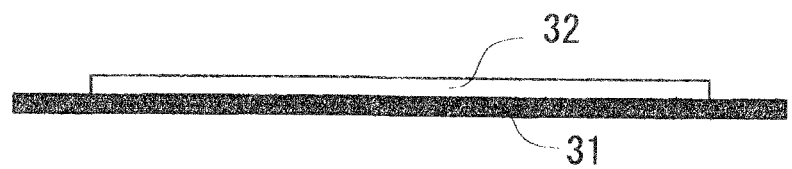
FIG. 2 (*a*)-(*e*) are cross-sectional diagrams of lithium ion secondary battery according to the manufacturing method of the present invention.
Figure 2:
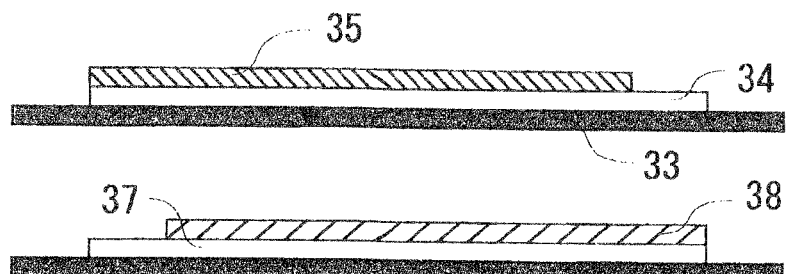
Figure 2:
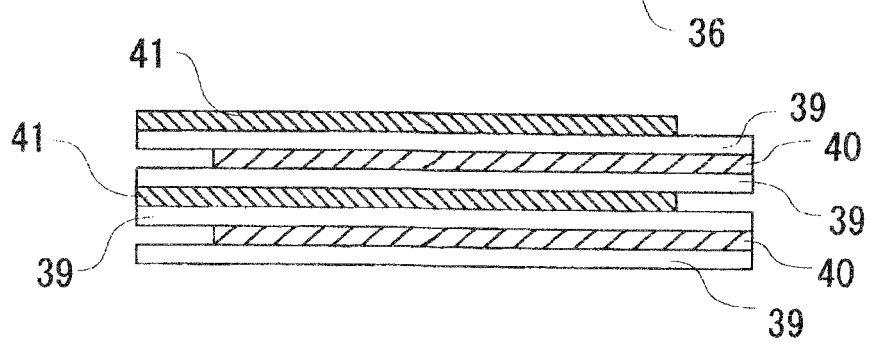
Figure 2:
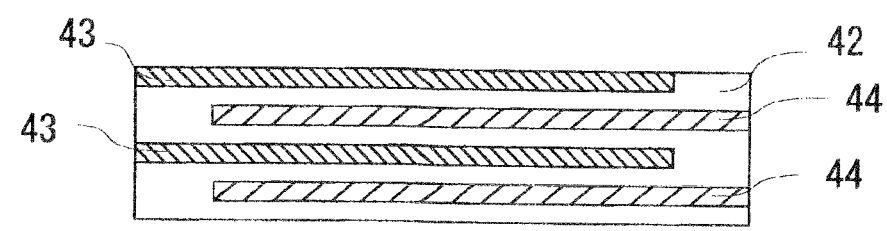
Figure 2:
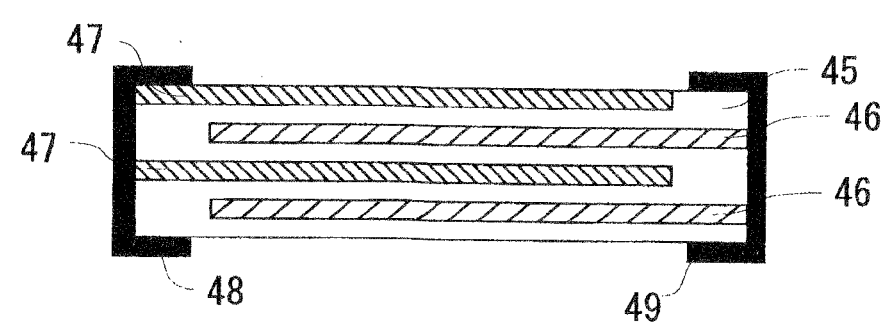

As the first concrete example of the manufacturing method, a manufacturing method of a multiplayer all solid state lithium ion secondary battery can be cited including the following process steps (1)-(5). FIG. 2 (a)-(e) are cross-sectional diagrams of lithium ion secondary battery according to the manufacturing method of the present invention.

Process step (1) Positive electrode paste including metal powder and positive electrode active material, negative electrode paste including metal powder and negative electrode active material, and solid electrolyte paste including solid electrolyte powder are prepared.

Process step (2) Solid electrolyte paste is coated and dried on a PET substrate 31 to form a solid electrolyte sheet (green-sheet) 32 (FIG. 2(a)). A green-sheet will be called simply a sheet below. Positive electrode paste is coated and dried on a solid electrolyte sheet 34 to form a positive electrolyte sheet 35 (FIG. 2(b)). And also, negative electrode paste is coated and dried on a solid electrolyte layer 36 to form a negative electrode sheet 38 (FIG. 2(b)).

Process step (3): A positive electrode unit where a solid electrolyte sheet and a positive electrode sheet are stacked is prepared by detaching from the PET substrate. A negative electrode unit is also prepared. Next, the positive electrode unit and the negative electrode unit are stacked alternately to form a laminate where a positive electrolyte sheet 43 and a negative electrode sheet 44 are stacked alternately interposed by a solid electrolyte sheet 42. At this time, optionally, the positive electrode unit and the negative electrode unit is stacked by alignment with a shift in order that the negative electrode sheet is not exposed at one side of the laminate and the positive electrode sheet is not exposed at the other side thereof (FIG. 2(c)).

Process step (4): The laminate is sintered to form a sintered laminate (FIG. 2(d)).

Process step (5): A positive electrode terminal 48 is formed at the side of the laminate so as to contact with a positive electrode layer 47, and a negative electrode terminal 49 is formed at the other side of the laminate so as to contact with a negative electrode layer 46. An electrode terminal (an extraction electrode) is formed, for example, by coating extraction electrode paste at each sides of the laminate, then sintering it at the temperature range of 500° C. to 900° C. A battery is completed, if necessary, by forming protection layer at the outer surface of the laminate, which is not illustrated.

As the second concrete example of the manufacturing method, a manufacturing method of a multiplayer all solid, state lithium ion secondary battery can be cited including the following process steps (1)-(4).

Process step (1): Positive electrode paste including metal powder and positive electrode active material, negative electrode paste including metal powder and negative electrode active material, and solid electrolyte paste including solid electrolyte powder are prepared.

Process step (2): Positive electrode paste, solid electrolyte paste, negative electrode paste, and solid electrolyte paste are coated and dried in sequence to form a laminate composed of green-sheets. At this time, optionally, a positive electrode unit and a negative electrode unit is stacked by alignment with a shift in order that a negative electrode sheet is not exposed at one side of the laminate and a positive electrode sheet is not exposed at the other side thereof.

Process step (3): If necessary, substrates used for the fabrication of green-sheets are detached, and the laminate is sintered to form a sintered laminate.

Process step (4): A positive electrode terminal is formed at the side of the laminate so as to contact with a positive electrode layer, and a negative electrode terminal is formed at the other side of the laminate so as to contact with a negative electrode layer. A battery is completed, if necessary, by forming protection layer at the outer surface of the laminate.

[Mixture Rate of Electrode Material]

(Conductivity and Discharge Capacity)

A battery was evaluated which was fabricated using several varied conditions of mixture ratio of active material to conductive material which compose the battery. The detail will be stated as follows.

Paste to form an electrode layer of the battery was prepared by mixing active material powder and conductive material powder using predetermined volume ratio, and dispersing them in solvent and binder. Positive electrode layer active material, negative electrode layer active material, and conductive material which was mixed with active material was, respectively, $LiMnO_4$, $Li_{4/3}Ti_{5/3}O_4$, and AgPd with weight mixture ratio of 85/15. Meanwhile, paste to form solid electrolyte layer was prepared by dispersing $Li_{3.5}Si_{0.5}P_{0.5}O_4$ in solvent and binder.

First, the evaluation result of conductivity and discharge capacity of the battery will be explained.

FIG. 3 is a graph illustrating the dependency of conductivity and discharge capacity on the volume mixture ratio of positive electrode active material. It was anticipated that weight mixture ratio would contribute more than volume mixture ratio to conductivity, so that conductivity was evaluated with volume mixture ratio as a parameter. The evaluation was conducted to the samples with positive electrode active material/conductive material mixture ratio in the range of 0:100 to 100:0. It was found that conductivity was sufficiently high, battery impedance was effectively low, and discharge capacity was sufficiently high, when positive electrode active material was mixed with volume ratio in the range of 20 vol % to 65 vol %. Conductivity was higher than $1 \times 10^1$ S/cm within this range of best volume ratio. Conductivity was also high when the volume mixture ratio of active material was less than 20 vol %, but discharge capacity was low because of small amount of active material. And conductivity dropped down rapidly when the volume mixture ratio of active material was higher than 65 vol %.

Figure 4:
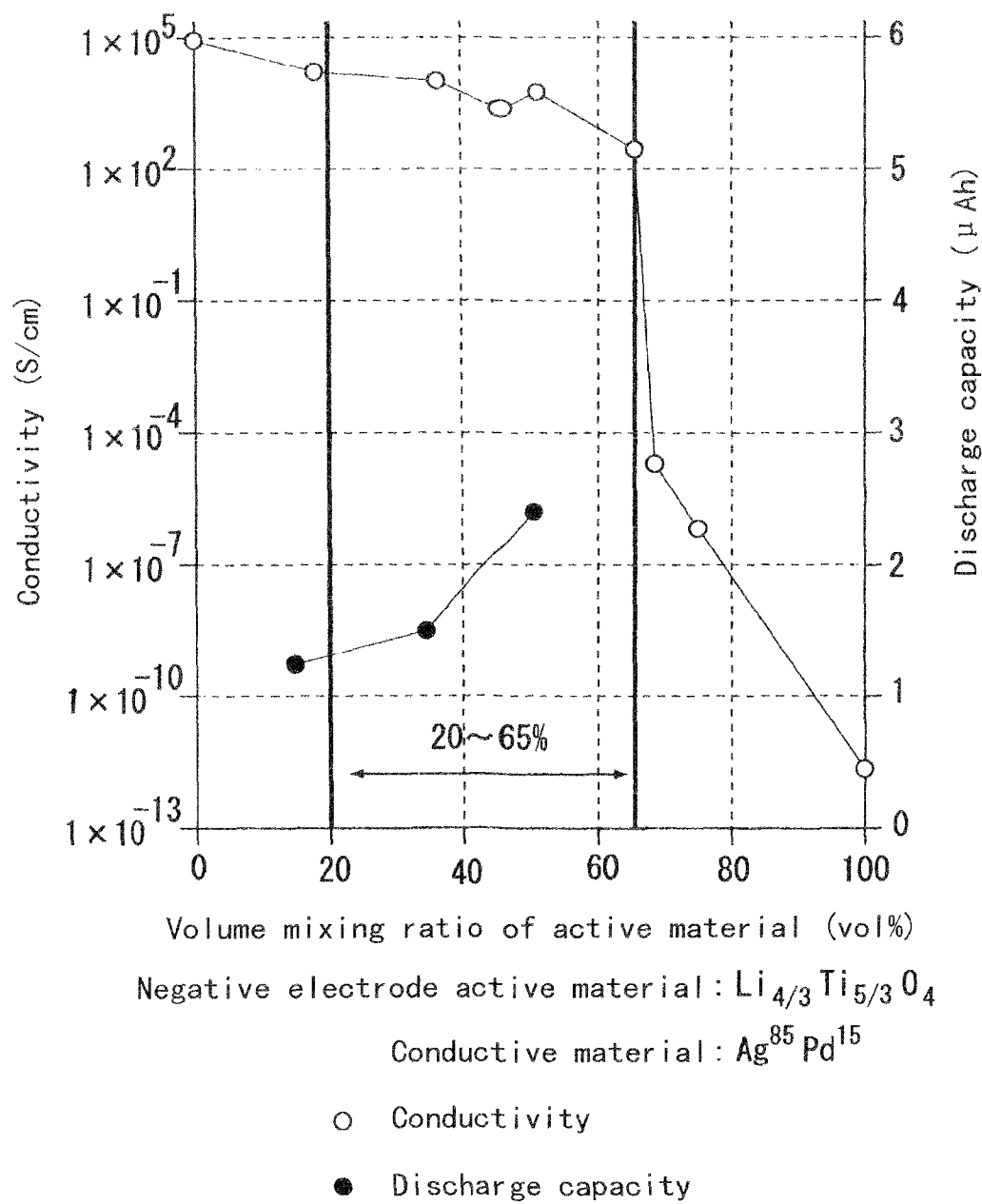
FIG. 4 is a graph illustrating the dependency of conductivity and discharge capacity on the volume mixture ratio of negative electrode active material.

FIG. 4 is a graph illustrating the dependency of conductivity and discharge capacity on the volume mixture ratio of negative electrode active material. The evaluation was conducted to the samples with negative electrode active material/conductive material mixture ratio in the range of 0:100 to 100:0. It was found that conductivity was sufficiently high, battery impedance was effectively low, and discharge capacity was sufficiently high, when negative electrode active material was mixed with volume ratio of 20 volt through 65 vol %. Conductivity was also higher than $1 \times 10^1$ S/cm with this best volume ratio.

(Charge-Discharge Behavior)

Figure 5:
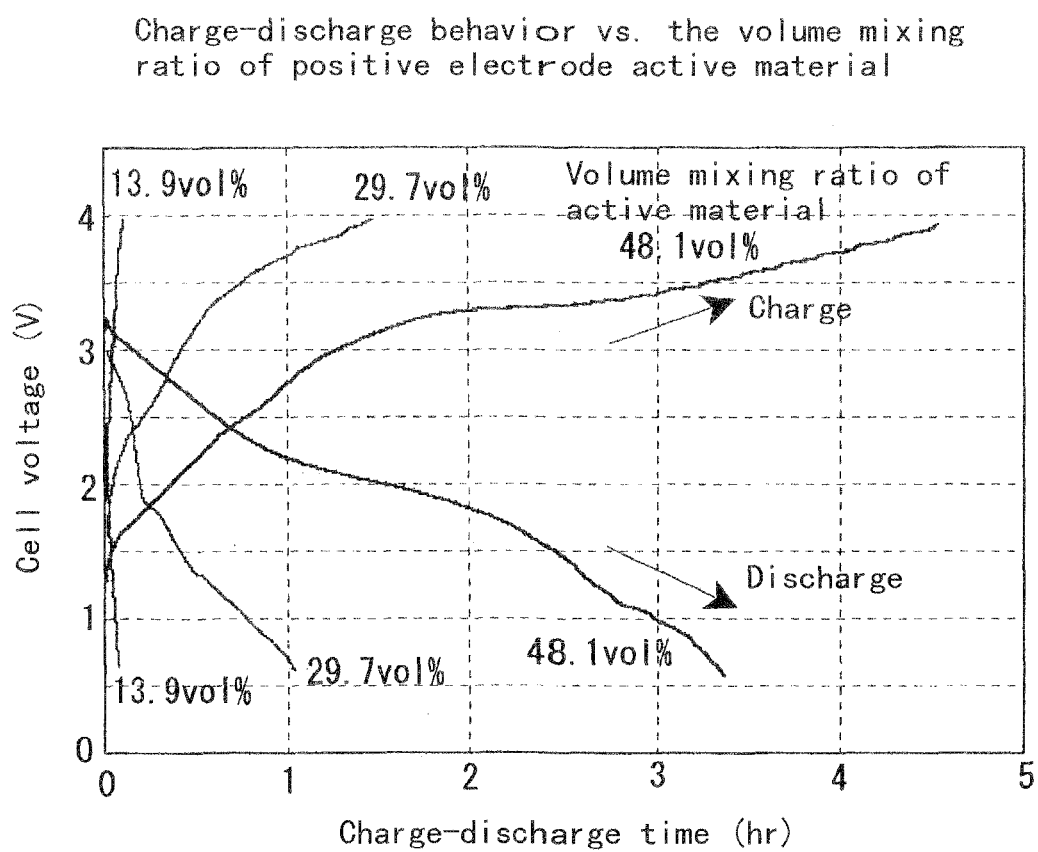
FIG. 5 is a graph illustrating the dependency of charge-discharge behavior on the volume mixture ratio of positive electrode active material.

FIG. 5 is a graph illustrating the dependency of charge-discharge behavior on the volume mixture ratio of positive electrode active material. Charge-discharge characteristics was measured for batteries fabricated with volume mixture ratio of positive electrode active material of 13.9, 29.7, 48.1 vol %. As shown in FIG. 5, charge-discharge time will increase which suggests that chargeable energy density will increase when the amount of active material increases.

Figure 6:
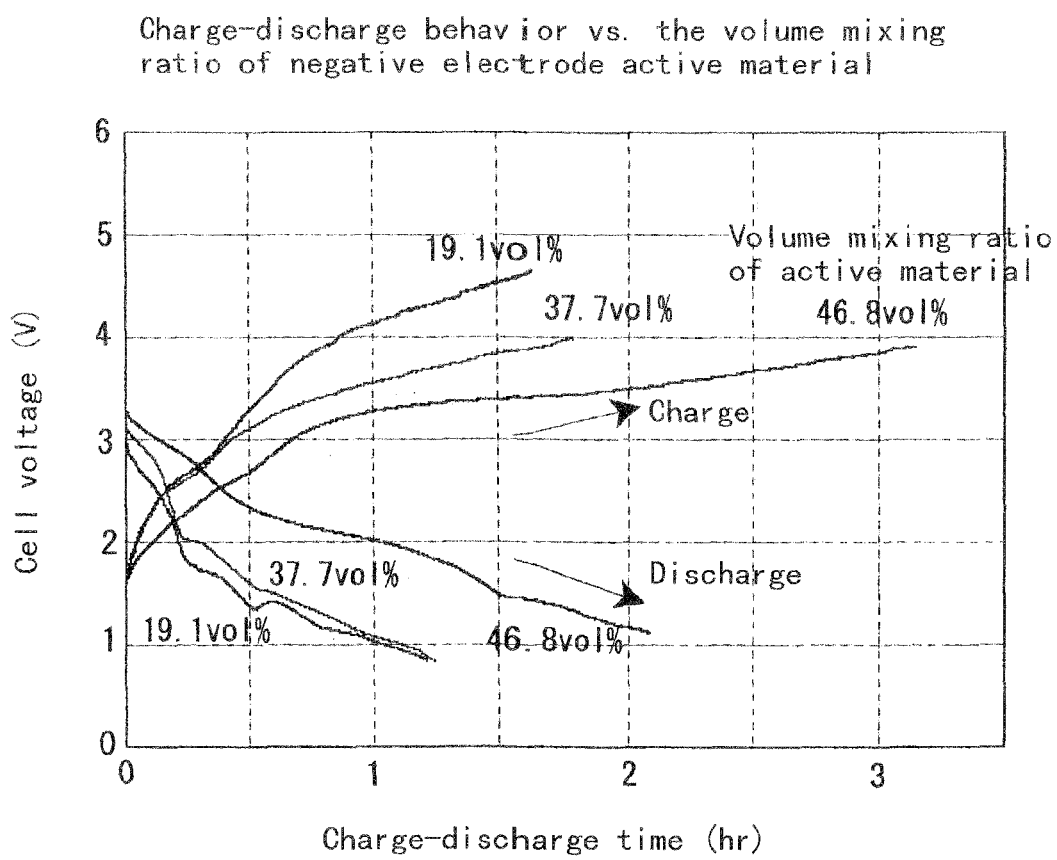
FIG. 6 is a graph illustrating the dependency of charge-discharge behavior on the volume mixture ratio of negative electrode active material.

FIG. 6 is a graph illustrating the dependency of charge-discharge behavior on the volume mixture ratio of negative electrode active material. Measurement was conducted using the same condition as the one used for FIG. 5. Charge-discharge characteristic was measured for batteries fabricated with volume mixture ratio of positive electrode active material of 19.7, 37.7, 46.8 vol %. As shown in FIG. 6, charge-discharge time will increase and the chargeable energy density will increase when the amount of active material increases in a similar way as positive electrode active material.

(Battery Cross-Section and SEM Image)

Figure 7:
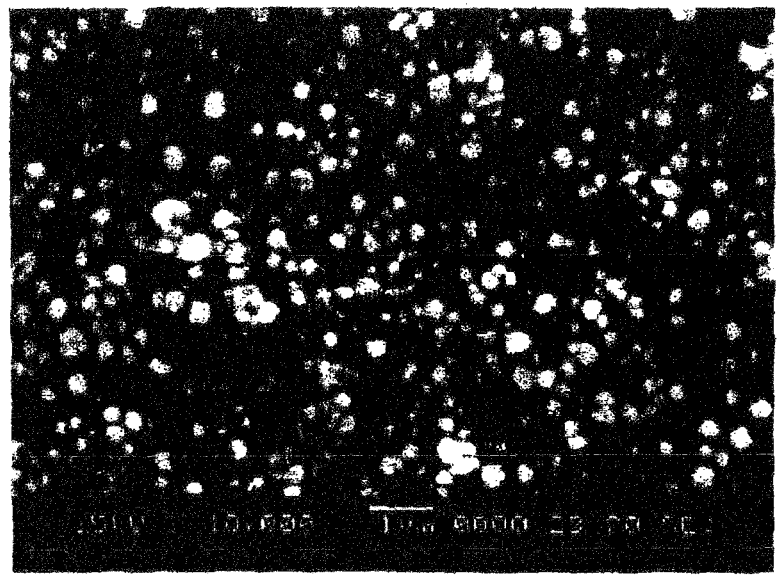
FIGS. 7 (*a*), (*b*) are SEM photographs of green-sheet cross-section before sintering.
Figure 7:
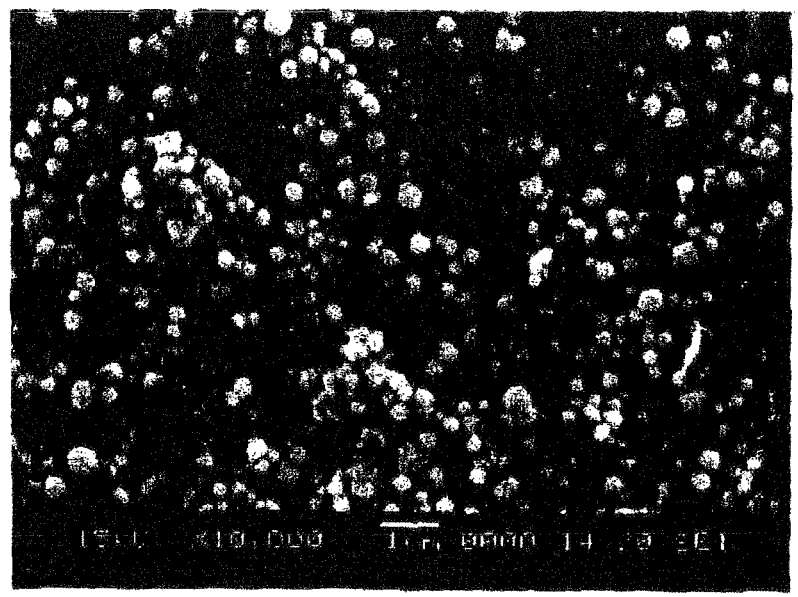
Figure 8:
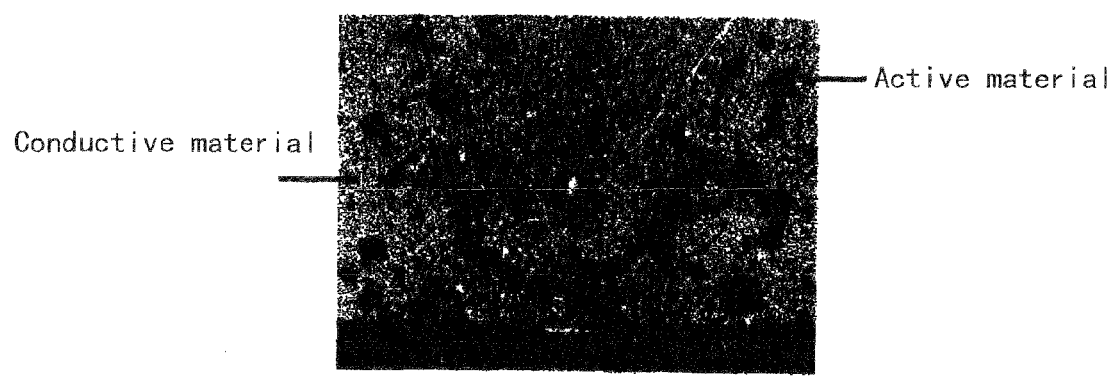
FIG. 8 is a SEM photograph of positive electrode after sintering.
Figure 8:
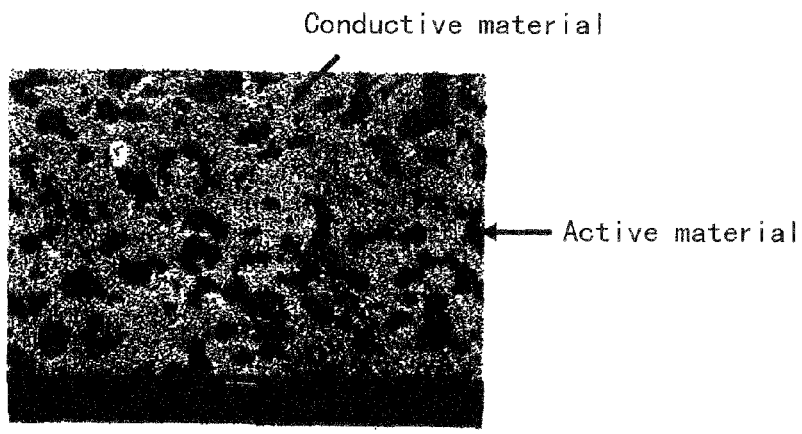
Figure 9:
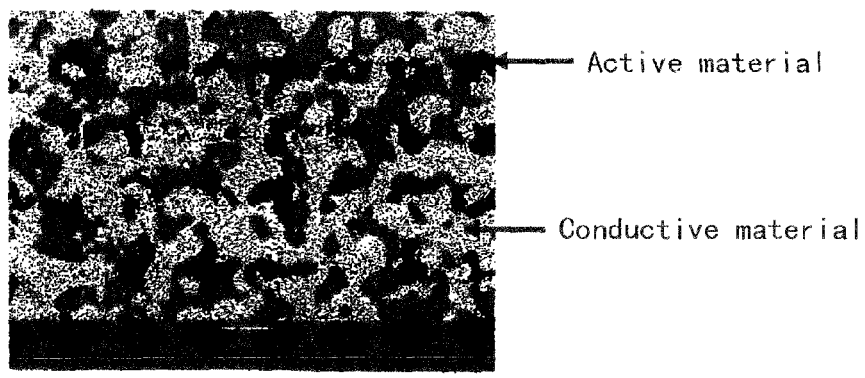
FIG. 9 is a SEM photograph of positive electrode after sintering.
Figure 9:
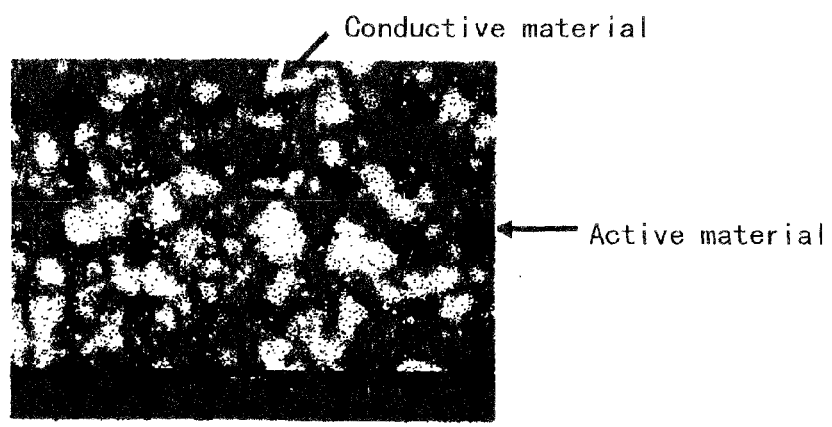
Figure 10:
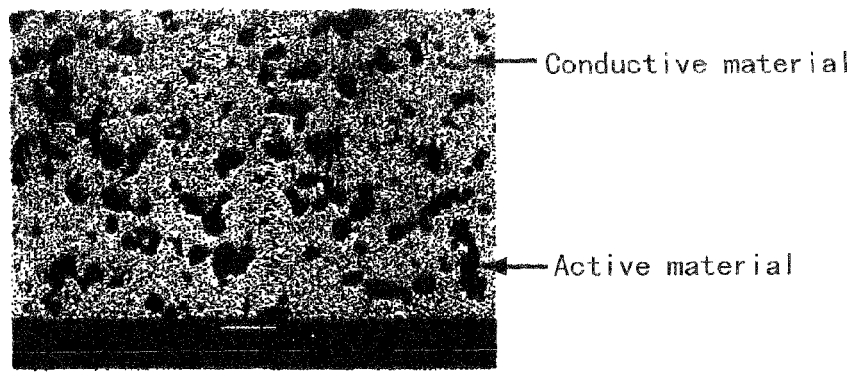
FIG. 10 is a SEM photograph of negative electrode after sintering.
Figure 10:
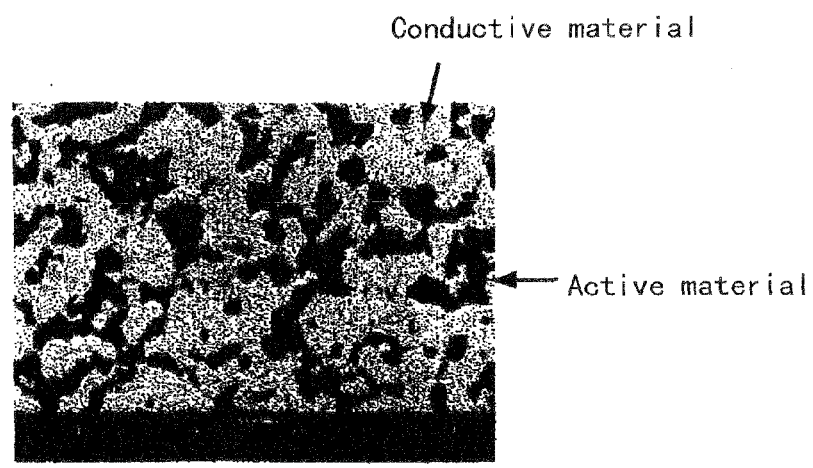
Figure 11:
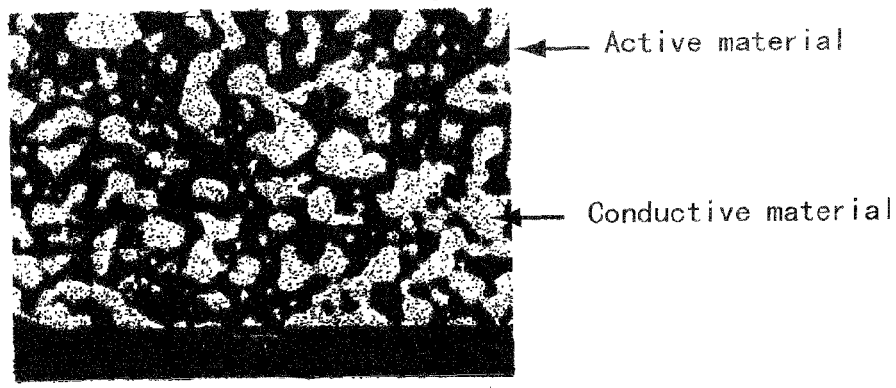
FIG. 11 is a SEM photograph of negative electrode after sintering.
Figure 11:
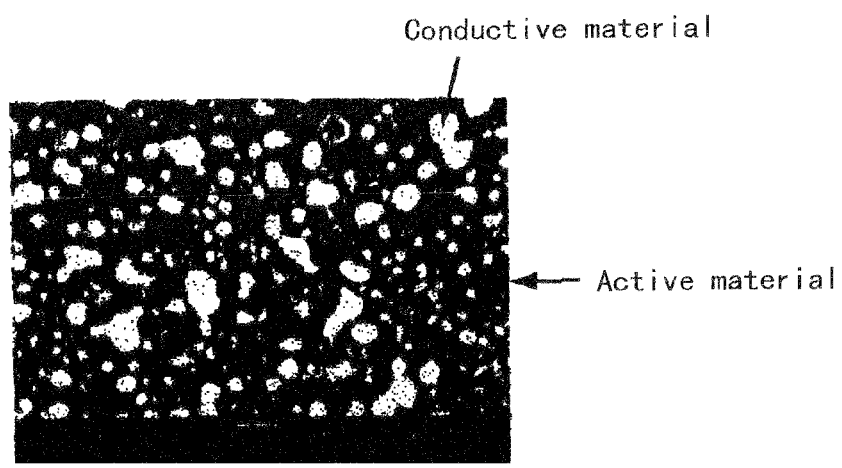

FIGS. 7 (a), (b) are SEM photographs green-sheet cross-section of a positive electrode and a negative electrode, respectively, before sintering. Volume mixture ratio of respective active material is 35.5 vol % and 41.8 vol %. The photographs show that coated and dried particles including active material particles and conductive material particles are uniformly dispersed in the paste, but are not connected each other to form conductive matrix when the green-sheet is not sintered.

FIG. 8-11 are SEM photographs of positive or negative electrode cross-section after sintering. The volume ratio of the positive electrode active material was varied from 15.1 vol % to 72.3 vol %, and that of the negative electrode active material was varied from 21.1 vol % to 81.1 vol %. Black part and white part in the photographs are active material and conductive material, respectively. The photographs show that the area ratio of active material will increase and the continuity of conductive material will degrade when the volume ratio of active material increases. Meanwhile, the area ratio of conductive material will increase and its continuity will be improved when the volume ratio of conductive material increases.

Figure 12:
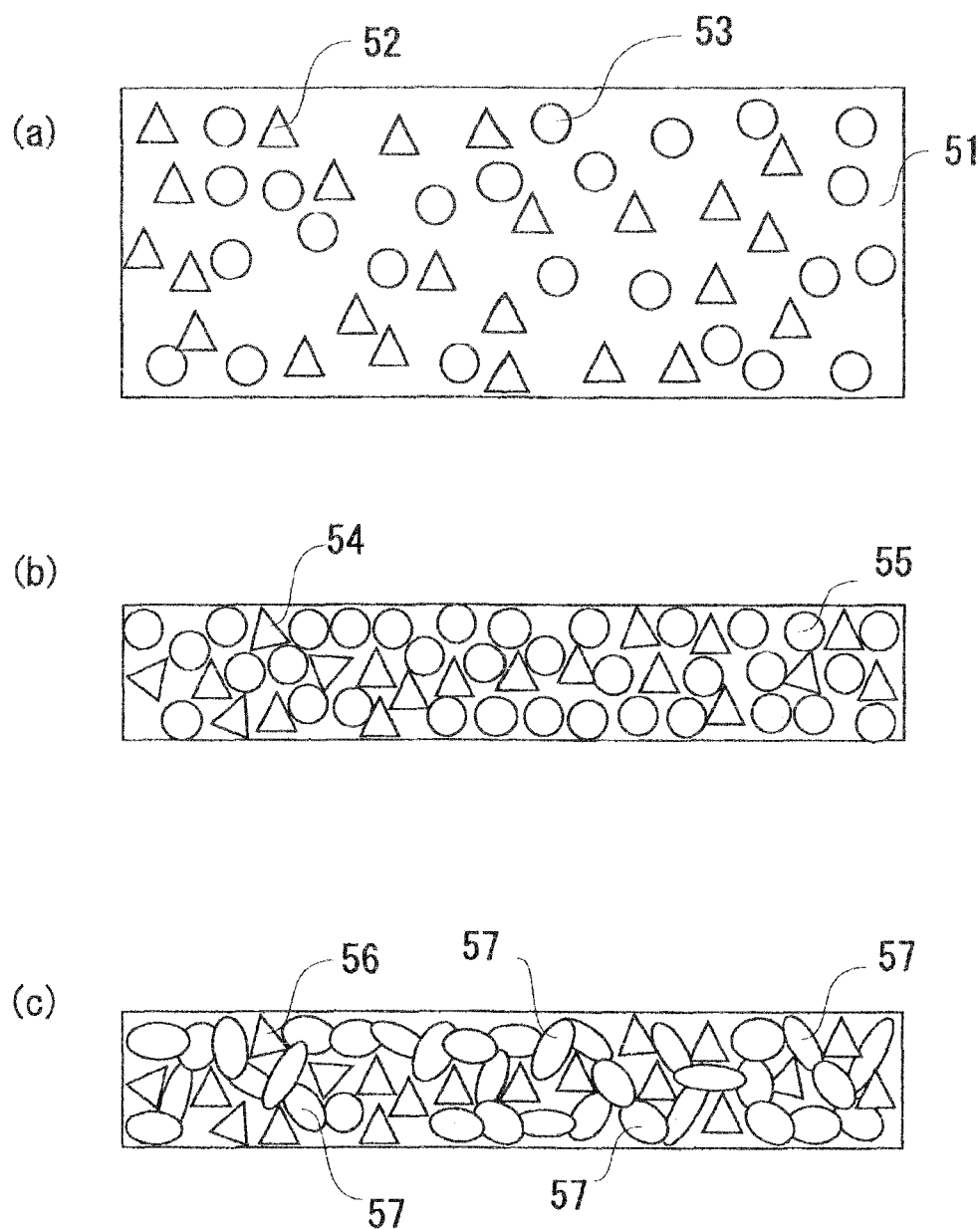
FIG. 12 (*a*)-(*c*) are the explanatory diagram of cross-sectional electrode structure for each step of manufacturing process.

FIG. 12 (a)-(c) are the explanatory diagram of cross-sectional electrode structure for each step of manufacturing process. These figures are drawn based on the photographs shown in FIG. 7 through 11. FIG. 12(a) shows a state where active material powder and conductive material powder are mixed using predetermined mixture ratio and are dispersed in solvent and binder. Active material particles 52 and conductive material particles 53 are uniformly dispersed in liquid. Next, FIG. 12(b) shows a state where paste is coated and dried and green-sheet is formed. Here, active material particles 54 and conductive material particles 55 are uniformly dispersed and in close contact with each other, but the continuity between each particles is not good, which suggest low conductivity. Next, FIG. 12(c) shows a state where conductive material particles 57 are densified by sintering and connected continuously to form a matrix structure where active material particles 56 are uniformly distributed and supported.

It is found that conductive matrix shown in FIG. 12(c) is formed and conductivity of electrode increases and discharge characteristics and discharge capacity are improved when a battery is fabricated using electrode material which is the mixture of active material and conductive material mixed with volume mixture ratio (active material/conductive material) in the range of 20:80 to 65:35. And when a photograph of electrode cross-section of the battery was observed, the area ration, of active material and conductive material was also in the range of 20:80 to 65:35.

(Difference from Similar Prior Art)

Patent Reference 3 describes that each of a positive electrode active material layer and a negative electrode active material layer in an all solid state lithium secondary battery may have a collector internally. The collector for positive electrode may be thin film, or 3-dimensional net structure (paragraph number [0093]). Also it describes that a collector forms 3-dimensional net structure in a green-sheet obtained using slurry (paragraph number [0131]). Furthermore it describes that a desired weight ratio of material particles of which the collector is made up included in the slurry to active material ranges from 50/100 to 300/100.

The difference between the present invention and Patent Reference 3 will be clarified as follows.

The mixture ratio of active material and conductive material which is described as preferable in the technology disclosed in Patent Reference 3 is confirmed to be within the range where the amount of active material is abundant and the amount of conductive material is quite low compared to the range of the best volume mixture ratio according to the present invention (The ratio of active material to conductive material ranges from 20:80 to 65:35.), when calculation is conducted assuming appropriate material density. Therefore, a battery fabricated using the best mixture ratio of active material to conductive material described in Patent Reference 3 will not be expected to show excellent battery performance since its impedance will be too high.

Furthermore, the inventors of the present invention have demonstrated using SEM photograph and impedance measurement data that conductive matrix is formed in electrode layer only after the process including the process steps comprising: preparing paste by mixing active material and conductive material using the best mixture ratio, forming green-sheets using the paste, and sintering the green-sheets, and also demonstrated that conductive matrix is not formed before sintering, again using SEM photograph and impedance measurement data. Meanwhile Patent Reference 3 describes that a 3-dimensional net structure is formed in a green-sheet, without using any data to prove the statement, and it does not disclose a concrete method to form the 3-dimensional net structure in a green-sheet and a concrete and detail structure thereof. In addition, Patent Reference 3 does not show impedance measurement data of a battery having the 3-dimensional net structure. Therefore it can be said that conductive matrix of the present invention is different from the 3-dimensional net structure described in Patent Reference 3.

EMBODIMENT

In the following, examples and a comparative example regarding the present invention will be described. The present invention is not limited to the following examples. In addition, the term "mixture ratio" refers to weight ratio, unless otherwise noted.

Example 1

Preparing Positive Electrode Paste $LiMn_2O_4$ fabricated using the following method was used as positive electrode active material.

$Li_2CO_3$ and $MnCO_3$ as starting material were weighed in order that the mole ratio would be 1:4. After that, wet blending was conducted on the mixed material for 16 hours by ball mill using water as solvent, and it was spin-dried. Obtained powder was baked for 2 hours at 800° C. in atmospheric ambient. Baked powder was broken into rough shatters, and wet blending was conducted on the broken powder for 16 hours by ball mill using water as solvent, and it was spin-dried to obtain positive electrode active material powder. Average grain size of the powder was 0.30 μm. The composition of obtained powder was confirmed to be $LiMn_2O_4$ by X-ray diffraction apparatus.

Positive electrode paste was prepared by mixing and dispersing the mixture of Ag/Pd as conductive material and $LiMn_2O_4$ as positive active material, ethyl cellulose as binder, and dihydroterpineol as solvent with a mixture ratio of 100:15:65 using 3 spindle roller. Beforehand, the mixture of Ag/Pd and $LiMn_2O_4$ was prepared with the volume mixture ratio of 20:80 to 90:10. Ag/Pd was prepared by mixing Ag powder with average grain size of 0.3 μm and Pd powder with average grain size of 1.0 μm with a mixture ratio of 85:15.

(Preparing Negative Electrode Paste)

$Li_{4/3}Ti_{5/3}O_4$ fabricated using the following method was used for negative electrode active material.

$Li_2CO_3$ and $TiO_2$ as starting material were weighed in order that the mole ratio would be 2:5. After that, wet blending was conducted on the mixed material for 16 hours by ball mill using water as solvent, and it was spin-dried. Obtained powder was baked for 2 hours at 800° C. in atmospheric ambient. Baked powder was broken into rough shatters, and wet blending was conducted on the broken powder for 16 hours by ball mill using water as solvent, and it was spin-dried to obtain negative electrode active material powder. Average grain size of the powder was 0.32 μm. The composition of obtained powder was confirmed to be $Li_{4/3}Ti_{5/3}O_4$ by X-ray diffraction apparatus.

Negative electrode paste was prepared by mixing and dispersing the mixture of Ag/Pd and $Li_{4/3}Ti_{5/3}O_4$, ethyl cellulose as binder, and dihydroterpineol as solvent with a mixture ratio of 100:15:65 using 3 spindle roller. Beforehand, the mixture of Ag/Pd and $Li_{4/3}Ti_{5/3}O_4$ was prepared with the mixture ratio of 60:40 Ag/Pd was prepared by mixing Ag powder with average grain size of 0.3 μm and Pd powder with average grain size of 1.0 μm with a mixture ratio of 85:15.

(Preparing Solid Electrolyte Sheet)

$Li_{3.5}Si_{0.5}P_{0.5}O_4$ fabricated using the following method was used for solid electrolyte material.

$Li_2CO_3$, $SiO_2$, and $Li_3PO_4$ as starting material were weighed in order that the mole ratio would be 2:1:1. After that, wet blending was conducted on the mixed material for 16 hours by ball mill using water as solvent, and it was spin-dried. Obtained powder was baked for 2 hours at 800° C. in atmospheric ambient. Baked powder was broken into rough shatters, and wet blending was conducted on the broken powder for 16 hours by ball mill using water as solvent, and it was spin-dried to obtain lithium ion conductive inorganic material powder. Average grain size of the powder was 0.54 μm. The composition of obtained powder was confirmed to be $Li_{3.5}Si_{0.5}P_{0.5}O_4$ by X-ray diffraction apparatus.

Lithium ion conductive inorganic material paste was prepared by wet blending above obtained, powder, ethanol, and toluene with a mixture ratio of 100:100:200 using ball mill. Then polyvinyl butyral family binder and butyl benzyl phthalate having relative amount of 16 and 4.8, respectively, were added to the obtained paste. The obtained paste was coated on a PET film as a substrate by doctor blade method to form a lithium ion conductive inorganic material sheet having a thickness of 13 μm.

(Preparing Paste for Extraction Electrode)

Ag powder and glass flit was mixed with a mixture ratio of 100:5, and ethyl cellulose as binder and dihydroterpineol as solvent having relative amount of 10 and 60, respectively, were added to the mixture. Then the mixture was mixed and dispersed by 3 spindle roller to obtain an extraction electrode.

Using above obtained pastes, a multilayer all solid lithium ion secondary battery with a structure shown in FIG. 2 was fabricated.

(Preparing Positive Electrode Unit)

Positive paste was printed having a thickness of 8 μm by screen printing on the above obtained lithium ion conductive inorganic material sheet having a thickness of 13 μm at the opposite side of the PET film. Next the printed positive electrode paste was dried for 5 to 10 min. at 80 to 100° C. to obtain a positive electrode unit where positive electrode paste was printed on the lithium ion conductive inorganic material sheet.

(Preparing Negative Electrode Unit)

Negative paste was printed having a thickness of 8 μm by screen printing on the above obtained lithium ion conductive inorganic material sheet having a thickness of 13 μm at the opposite side of the PET film. A negative electrode unit where negative electrode paste was printed on the lithium ion conductive inorganic material sheet was obtained.

(Preparing Laminate)

PET films were detached from each of obtained positive electrode unit and negative electrode unit, and they were stacked alternately interposed by lithium ion conductive inorganic material to form a laminate with appropriate alignment shift so that positive electrode collector protruded only at one edge and negative electrode collector protruded only at the other edge. The laminate was molded with pressure of 1000 kgf/cm2 at 800° C. and cut to form a laminate block. Thereafter, the laminate was sintered, to obtain a sintered laminate. Sintering process was conducted with rate of temperature increase of 200° C./hour in air up to 1000° C., then heated at the temperature for 2 hours, and cooled down naturally. The thickness of lithium ion conductive inorganic material, positive electrode unit, and negative electrode unit which compose the sintered laminate was respectively 7 μm, 5 μm, and 6 μm. The height, width, and depth of the laminate were 0.1 mm, 8 mm, 8 mm, respectively.

(Forming Extraction Electrode)

Extraction electrode paste was coated on the edge surface of the sintered laminate, and heated at 800° C. to form one pair of extraction electrodes, and an all solid lithium ion secondary battery was obtained.

Comparative Example 1

Preparing Positive Electrode Paste

Positive electrode paste was prepared by mixing and dispersing $LiMn_2O_4$, ethyl cellulose as binder, and dihydroterpineol as solvent with a mixture ratio of 100:15:65 using 3 spindle roller. Beforehand, $LiMn_2O_4$ was prepared using the same method of example 1.

(Preparing Negative Electrode Paste)

Negative electrode paste was prepared by mixing and dispersing $Li_{4/3}Ti_{5/3}O_4$, ethyl cellulose as binder, and dihydroterpineol as solvent with a mixture ratio of 100:15:65 using 3 spindle roller. Beforehand, $Li_{4/3}Ti_{5/3}O_4$ was prepared using the same method of example 1.

(Preparing Collector Paste)

Collector paste was prepared by mixing and dispersing AgPd, ethyl cellulose as binder, and dihydroterpineol as solvent with a mixture ratio of 100:10:50 using 3 spindle roller. Beforehand, Ag/Pd was prepared by mixing Ag powder having an average grain size of 0.3 μm and Pd powder having an average grain size of 1.0 μm with a mixture ratio of 85:15.

Solid electrolyte paste, positive (negative) electrode active material paste, collector paste, and positive (negative) electrode active material paste were coated and dried in sequence to form positive (negative) electrode unit to form a laminate in comparative example 1. Except for the structure of the laminate, a battery in comparative example 1 was fabricated using the similar method as a battery in example 1. The thickness of solid electrolyte layer, positive electrode material layer, negative electrode material layer, and collector layer was 7 μm, 5 μm, 5 μm, and 3 μm, respectively, in the laminate after sintering.

(Evaluation)

Wire leads were electrically connected to respective extraction electrode which was electrically connected with a positive electrode unit and a negative electrode unit, and evaluation of battery discharge capacity was conducted. Charge current and discharge current were respectively 3 μA and 3 μA and stop voltage during charge and discharge was respectively 4.0V and 0.5V. Table 1 illustrates the evaluation result.

Also the conductivity of positive electrode active material for an electrode (positive electrode unit) in example 1 and the conductivity of positive electrode active material in comparative example 1 were evaluated. Table 1 also illustrates the evaluation result.

TABLE 1

| | volume mixture ratio of positive electrode active material [vol %] | conductiviy [S/cm] | discharge capacity [μAh] |
|---|---|---|---|
| example 1 | 10 | $3.2 \times 10^4$ | 0.3 |
| | 20 | $2.4 \times 10^4$ | 2.0 |
| | 40 | $9.6 \times 10^3$ | 2.8 |
| | 60 | $7.9 \times 10^5$ | 3.9 |
| | 70 | $4.9 \times 10^{-4}$ | Battery does not function |
| comparative example 1 | — | $7.7 \times 10^{-5}$ | 1.5 |

As shown in table 1, a battery with a volume mixture ratio of positive electrode active material in the range of 10 to 60 vol % fabricated in example 1 has shown high conductivity of higher than $10^1$ S/cm which is metal conductivity, and excellent battery function was confirmed. In comparison, when the volume mixture ratio is 70 vol %, conductivity increased rapidly, and the battery did not function. It is estimated that the reason why the battery did not function is due to low conductivity of the electrode, because metal matrix undertakes the similar role of collector in case of a conventional battery. Meanwhile, discharge capacity showed a tendency to be higher for higher volume mixture ratio of active material, when compared at the active material volume ratio in the range of 10 to 60 vol %. But a battery with active material ratio of 10 vol. % is not practical. So, it is confirmed that the best volume mixture ratio of positive electrode active material ranges from 20 to 60 vol %.

In addition, batteries fabricated in example with positive electrode active material volume ratio in the range of 20 to 60 vol % showed higher discharge capacity than a battery in comparative example 1 even though the former has less active material amount than the latter. This is estimated that a battery in example 1 could make use of active material with high efficiency since it has low internal impedance.

Example 2

Figure 15:
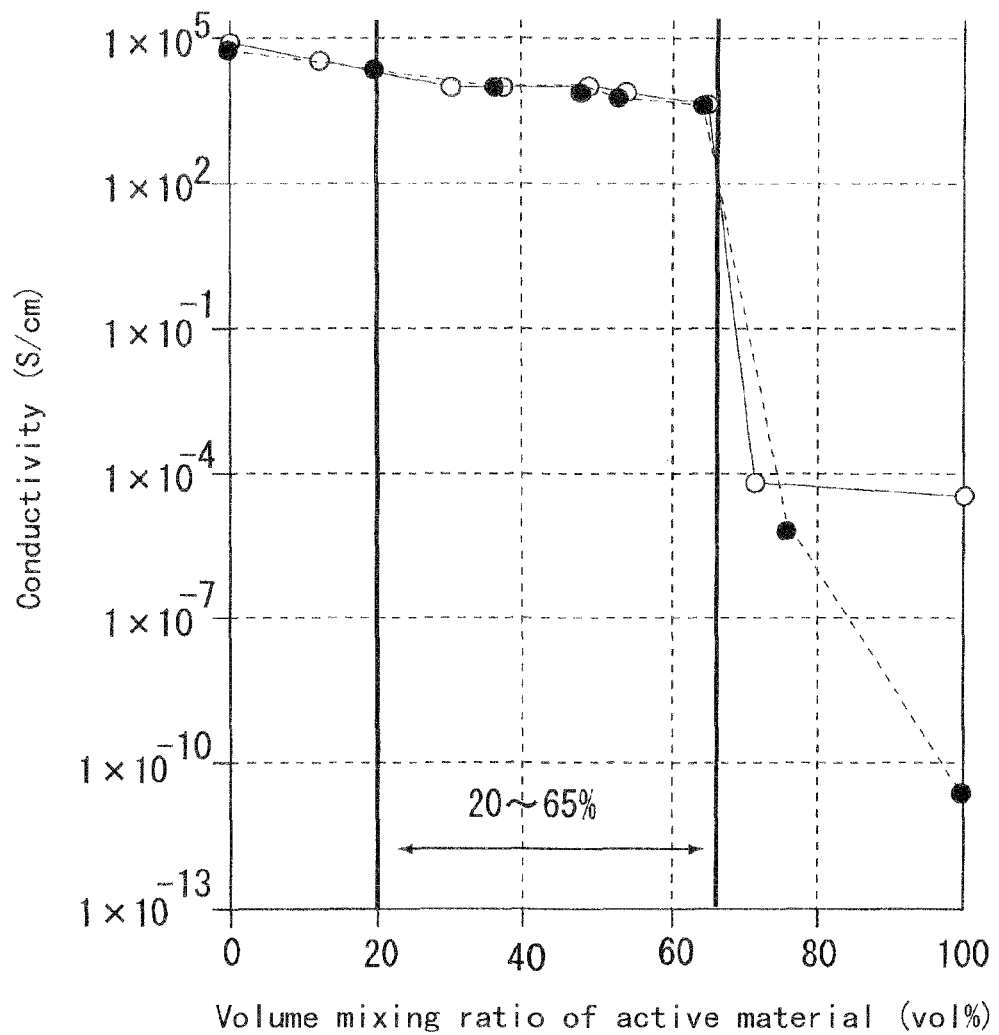
FIG. 15 is a graph illustrating the dependency of conductivity on the volume mixing ratio of active material.
Figure 16:
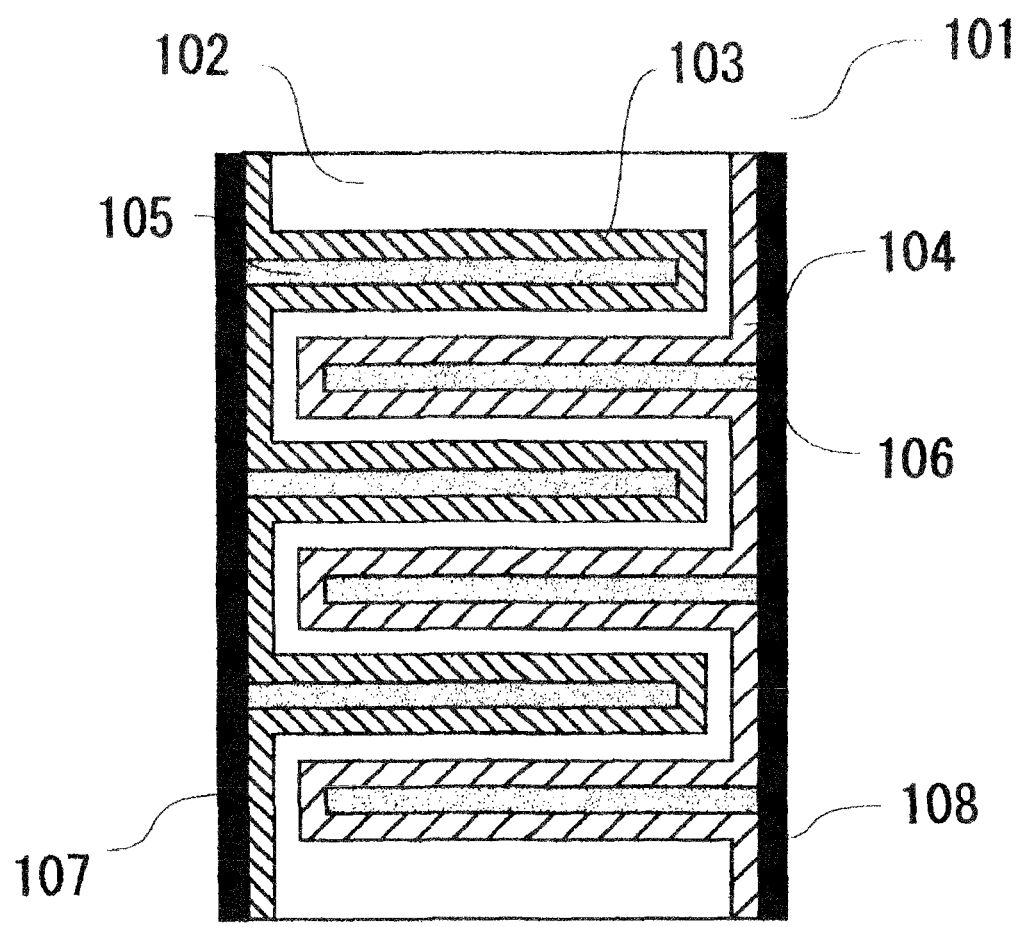
FIG. 16 is cross-sectional diagrams of a conventional lithium ion secondary battery.

A battery was fabricated having a positive electrode comprising mixture of active material $LiCoO_2$ and conductive material Ag, and a negative electrode comprising mixture of active material $Nb_2O_5$ and conductive material Ag, with volume mixture ratio of active material and conductive material in the range from 0:100 to 100:0, and the conductivity of the battery was evaluated. FIG. 15 is a graph illustrating the dependency of conductivity on the volume mixture ratio of active material. When the materials mentioned above are used, it is also found that the measured battery has high conductivity of not less than $1\times10^1$ S/cm, and effective reduction of battery impedance is achieved in case that the volume mixture ratio of active material is not more than 65 vol %.

(SEM Image and EDS Image of Battery Cross-Section)

Figure 13:
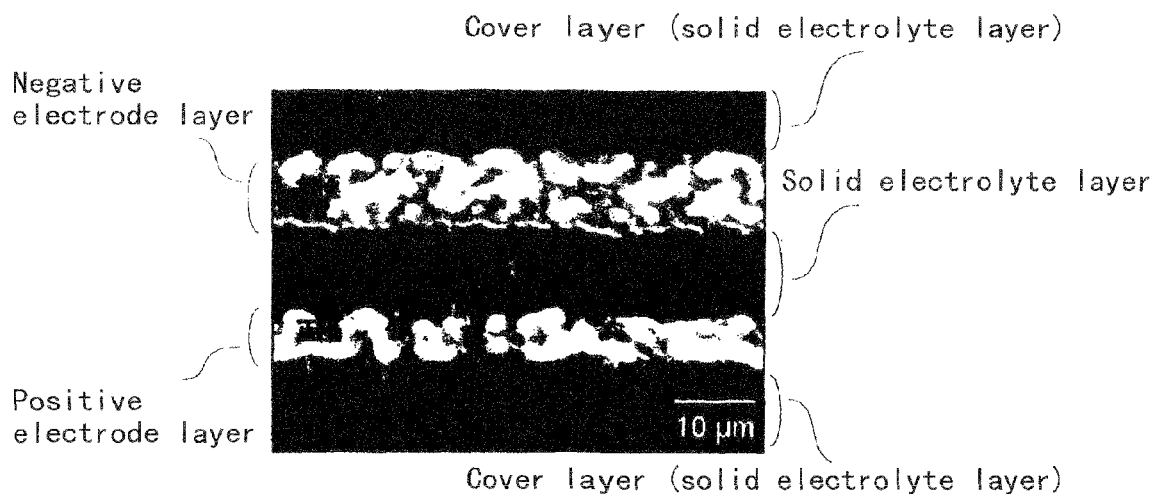
FIGS. 13 (*a*), (*b*) are the SEM image and the EDS image of a cross-sectional battery surface after sintering, respectively.
Figure 13:
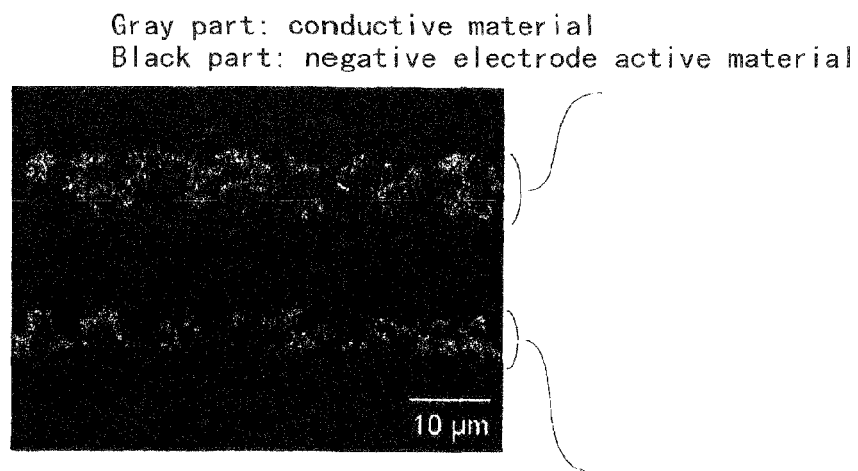
Figure 14:
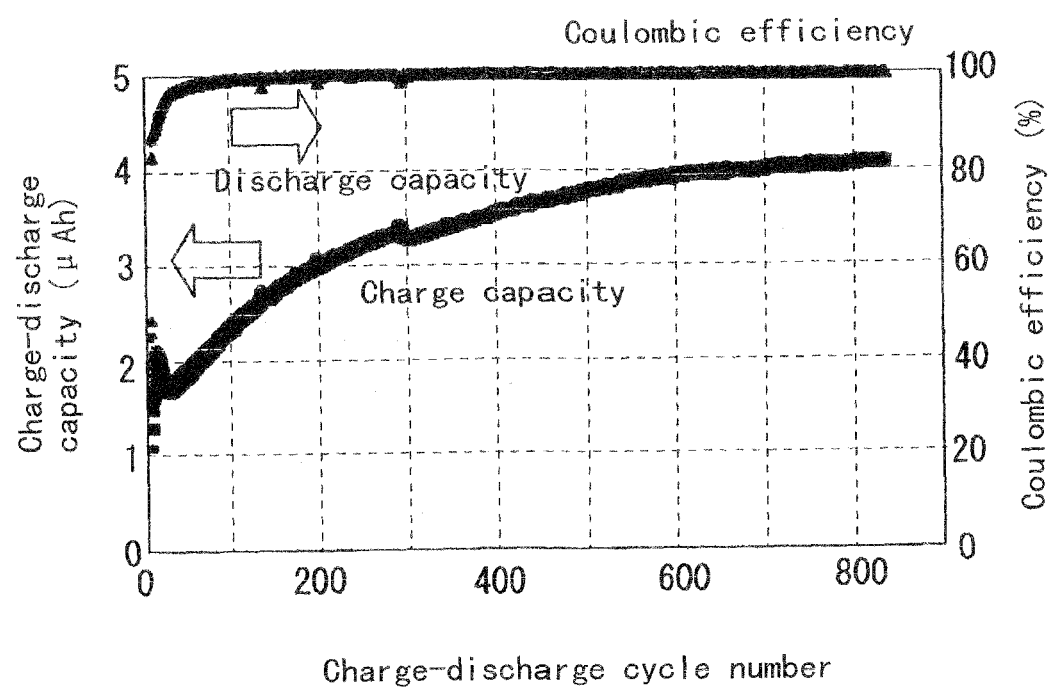
FIG. 14 is a graph illustrating the charge-discharge cycle characteristics of lithium ion secondary battery of the present invention.

Battery cross-section was observed using FE-SEM and component analysis using EDS was conducted for the prepared battery in example 1 having positive electrode active material mixture ratio of 60 vol %. FIG. 13 illustrates the result. FIG. 14 illustrates the charge-discharge cycle characteristics of a battery having positive electrode active material mixture ratio of 60 vol %.

FIG. 13(a) is SEM image of battery cross-section after sintering, and FIG. 13(b) is EDS image corresponding to the SEM image in FIG. 13(a). According to these images, it is confirmed that a positive electrode layer has a structure wherein positive electrode active material $LiMn_2O_4$ is supported in metal matrix of AgPd, and a negative electrode layer has a structure wherein negative electrode active material $Li_{4/3}Ti_{5/3}O_4$ is supported in metal matrix of AgPd.

FIG. 14 is a graph illustrating the charge-discharge cycle characteristics. Quite high coulombic efficiency of nearly 100% was observed for the battery prepared by example 1. On the other hand, coulombic efficiency of a battery prepared by comparative example 1 was 80%, which was fabricated by stacking active material layer and collector layer without mixing active material and conductive material.

In a battery according to the present invention wherein conductive matrix is formed in an electrode, it is presumed that excellent cycle characteristics illustrated in FIG. 14 is obtained, since active material is entwined with conductive material which works as a collector as illustrated in FIG. 13 and the separation of active material and conductive material due to the volume change by intercalation-deintercalation reaction which occurred in comparative example 1 is suppressed.

INDUSTRIAL APPLICABILITY

As described above, a lithium ion secondary battery and manufacturing method thereof according to the present invention is effective for the simplification of manufacturing process and the cost reduction thereof, and also effective for the improvement of battery efficiency. It is suitably used for providing low-cost high-performance small-sized large-capacity batteries, and greatly contributes especially in electronics.

The invention claimed is:

1. A solid state lithium ion secondary battery, comprising a multilayer laminate in which a positive electrode layer and a negative electrode layer are stacked and alternately interposed by a solid electrolyte layer,
   said positive electrode layer and/or said negative electrode layer having a structure where active material is supported by a conductive matrix comprising conductive material,
   wherein the volume ratio of said active material to said conductive material is in a range of 20:80 to 65:35,
   the conductive material is an oxidation resistant metal or oxidation resistant alloy having an electrical conductivity greater than $1\times10^1$ S/cm after sintering, and
   the battery does not comprise a collector layer.

2. The battery according to claim 1, comprising a plurality of battery unit cells, each unit cell comprising said laminate, and connected in parallel, in series, or in series-parallel combination.

3. The battery according to claim 2, wherein said laminate is formed by stacking said positive electrode layer, said solid electrolyte layer, and said negative electrode layer to form said laminate, and then co-firing said laminate.

4. The battery according to claim 2, wherein said active material comprises a transition metal oxide or transition metal composite oxide.

5. The battery according to claim 2, wherein said active material comprises one or more compound selected from the group consisting of: lithium manganese composite oxide, lithium nickel composite oxide, lithium cobalt composite oxide, lithium vanadium composite oxide, lithium titanium composite oxide, manganese dioxide, titanium oxide, niobium oxide, vanadium oxide, and tungsten oxide.

6. The battery according to claim 1, wherein said laminate is formed by stacking said positive electrode layer, said solid electrolyte layer, and said negative electrode layer to form said laminate, and then co-firing said laminate.

7. The battery according to claim 6, wherein said active material comprises a transition metal oxide or transition metal composite oxide.

8. The battery according to claim 6, wherein said active material comprises one or more compound selected from the group consisting of: lithium manganese composite oxide, lithium nickel composite oxide, lithium cobalt composite oxide, lithium vanadium composite oxide, lithium titanium composite oxide, manganese dioxide, titanium oxide, niobium oxide, vanadium oxide, and tungsten oxide.

9. The battery according to claim 1, wherein said active material comprises a transition metal oxide or transition metal composite oxide.

10. The battery according to claim 9, wherein said active material comprises one or more compound selected from the group consisting of: lithium manganese composite oxide, lithium nickel composite oxide, lithium cobalt composite oxide, lithium vanadium composite oxide, lithium titanium composite oxide, manganese dioxide, titanium oxide, niobium oxide, vanadium oxide, and tungsten oxide.

11. The battery according to claim 1, wherein said active material comprises one or more compound selected from the group consisting of: lithium manganese composite oxide, lithium nickel composite oxide, lithium cobalt composite oxide, lithium vanadium composite oxide, lithium titanium composite oxide, manganese dioxide, titanium oxide, niobium oxide, vanadium oxide, and tungsten oxide.

12. The battery according to claim 1, wherein said conductive material comprises a metal selected from the group consisting of: silver, palladium, gold, platinum, aluminum and an alloy of more than two metals selected from the group consisting of silver, palladium, gold, platinum, copper, and aluminum.

13. The battery according to claim 1, wherein:
said active material in said positive electrode layer is lithium manganese composite oxide,
said active material in said negative electrode layer is lithium titanium composite oxide, and
said conductive material is silver palladium.

14. The battery according to claim 1, wherein the multilayer laminate has been sintered at a temperature between 600-1100° C.

15. The battery according to claim 1, wherein the conductive material has an electrical conductivity of greater than $1 \times 10^3$ S/cm after sintering.

16. The battery according to claim 1, wherein said positive electrode layer and said negative electrode layer each have a structure where active material is supported by a conductive matrix comprising conductive material,
the volume ratio of said active material to said conductive material in the positive electrode is in a range of 29.7:70.3 to 48.1:51.9, and
the volume ratio of said active material to said conductive material in the negative electrode is in a range of 37.7:62.3 to 46.8:53.2.

\* \* \* \* \*